United States Patent
Sun et al.

(10) Patent No.: US 9,961,557 B2
(45) Date of Patent: May 1, 2018

(54) SPECTRUM RESOURCE MANAGEMENT DEVICE AND METHOD

(71) Applicant: SONY CORPORATION, Tokyo (JP)

(72) Inventors: Chen Sun, Beijing (CN); Xin Guo, Beijing (CN)

(73) Assignee: Sony Corporation, Tokyo (JP)

(*) Notice: Subject to any disclaimer, the term of this patent is extended or adjusted under 35 U.S.C. 154(b) by 0 days. days.

(21) Appl. No.: 15/305,283

(22) PCT Filed: May 27, 2015

(86) PCT No.: PCT/CN2015/079898
§ 371 (c)(1),
(2) Date: Oct. 19, 2016

(87) PCT Pub. No.: WO2015/180641
PCT Pub. Date: Dec. 3, 2015

(65) Prior Publication Data
US 2017/0041802 A1 Feb. 9, 2017

(30) Foreign Application Priority Data
May 29, 2014 (CN) .......................... 2014 1 0235319

(51) Int. Cl.
H04W 72/00 (2009.01)
H04W 16/10 (2009.01)
(Continued)

(52) U.S. Cl.
CPC .......... *H04W 16/10* (2013.01); *H04W 16/14* (2013.01); *H04W 72/044* (2013.01)

(58) Field of Classification Search
CPC ..... H04W 72/04; H04W 76/02; H04W 16/12; H04W 16/14; H04W 64/00; H04W 4/02;
(Continued)

(56) References Cited

U.S. PATENT DOCUMENTS 8,983,376 B2  3/2015  Lin et al.
9,066,239 B2  6/2015  Lin et al.
(Continued)

FOREIGN PATENT DOCUMENTS

CN  101448321 A  6/2009
CN  102802161 A  11/2012

OTHER PUBLICATIONS

International Search Report dated Aug. 28, 2015 in PCT/CN2015/079898 filed May 27, 2015.

*Primary Examiner* — Dai A Phuong
(74) *Attorney, Agent, or Firm* — Oblon, McClelland, Maier & Neustadt, L.L.P.

(57) ABSTRACT

A spectrum resource management device: determines available spectrum resources of a target communication system, so that aggregation interference caused by the target communication system and a communication system with a low right against a communication system with a high right in a management area does not exceed an interference threshold of the communication system with a high right; reduces available spectrum resources of the communication system with a low right, so that the interference caused by the communication system with a low right against the target communication system does not exceed an interference threshold of the target communication system; and updates the available spectrum resources of the target communication system according to the reduced available spectrum resources of the communication system with a low right, so that the aggregation interference does not exceed the interference threshold of the communication system with a high right.

19 Claims, 11 Drawing Sheets

(51) Int. Cl.
*H04W 16/14* (2009.01)
*H04W 72/04* (2009.01)

(58) Field of Classification Search
CPC ... H04W 24/00; H04W 72/082; H04W 28/04; H04B 1/1027; H04B 17/0042
USPC ............. 455/434, 435.2, 443–448, 450–453, 455/512–513; 370/329–334
See application file for complete search history.

(56) References Cited

U.S. PATENT DOCUMENTS

| | | | | | |
|---|---|---|---|---|---|
| 2008/0159207 | A1* | 7/2008 | Levine | ............... | H04W 16/14 370/329 |
| 2010/0150134 | A1* | 6/2010 | Qiu | ............... | H04L 47/781 370/352 |
| 2013/0029706 | A1* | 1/2013 | Sachs | ............... | H04W 16/14 455/501 |
| 2013/0129004 | A1* | 5/2013 | Sun | ............... | H04L 5/0032 375/285 |
| 2013/0208587 | A1* | 8/2013 | Bala | ............... | H04W 16/14 370/230 |
| 2013/0310062 | A1* | 11/2013 | Liu | ............... | H04W 16/14 455/454 |
| 2014/0080535 | A1* | 3/2014 | Gauvreau | ............... | H04W 16/14 455/513 |
| 2014/0105140 | A1* | 4/2014 | Guo | ............... | H04W 16/14 370/329 |
| 2014/0206374 | A1* | 7/2014 | Luo | ............... | H04W 16/10 455/452.1 |
| 2014/0315593 | A1* | 10/2014 | Vrzic | ............... | H04W 52/38 455/522 |
| 2015/0119014 | A1* | 4/2015 | Muraoka | ............... | H04W 16/14 455/418 |
| 2015/0189032 | A1* | 7/2015 | Duquene | ............... | H04L 51/046 709/204 |
| 2015/0195844 | A1* | 7/2015 | Yang | ............... | H04W 52/241 455/452.2 |
| 2015/0281972 | A1* | 10/2015 | Prytz | ............... | H04W 16/14 370/329 |
| 2015/0341939 | A1* | 11/2015 | Sharma | ............... | H04W 72/08 370/329 |
| 2016/0249384 | A1* | 8/2016 | Di Girolamo | ............... | H04W 74/0808 |

* cited by examiner

SPECTRUM RESOURCE MANAGEMENT DEVICE AND METHOD

FIELD

The present disclosure generally relates to the field of wireless communication, and in particular to a spectrum resource management device and method for a region where there are multiple levels of communication systems.

BACKGROUND

With evolution of a wireless communication system, users have increasingly high service requirements for a high quality, a high speed and a new service. Wireless communication operators and device manufactures need to improve a system continuously to meet the requirements of the users. This requires a lot of spectrum resources (for example, which may be quantified using parameters such as time, a frequency, a bandwidth and an allowable maximum transmission power and so on) to support the new service and meet the requirement of high speed communication. Limited spectrum resources have been distributed to fixed operators and services, and hence new available spectrums are either scarce or expensive.

In this case, a concept of dynamic spectrum utilization is proposed, i.e., dynamically utilizing spectrum resources which have been distributed to certain services but are not utilized sufficiently. For example, spectrums of some channels having no broadcast program or spectrums of adjacent channels thereof in digital TV broadcasting spectrums are dynamically utilized to perform wireless mobile communication, without interfering with receiving of TV signals. In this application example, since the TV broadcasting spectrums per se have been distributed to a TV broadcast system for use, the TV broadcast system is a primary system and a TV set is a primary user. A mobile communication system is a communication system which uses spectrum resources of the primary system without interfering with the primary system, and hence the mobile communication system is a secondary system and a receiver in the mobile communication system is a secondary user. Here, the primary system may refer to a system having spectrum use authority, for example the TV broadcast system, and the secondary system is a system which has no spectrum use authority and appropriately uses spectrums of the primary system only in a case that the primary system does not use the spectrums.

In addition, both the primary system and the secondary system may be systems having the spectrum use authority, but they have different priorities for spectrum use, i.e., having different spectrum resources use authorities. For example, in a case that the operator deploys a new base station to provide a new service, existing base stations and services thereof have priorities for spectrum use. The primary system includes a primary user base station and a primary user, and the secondary system includes a secondary user base station and a secondary user.

In a case that the secondary system provides an emergency service or has a certain communication Quality of Service (QoS) requirement, the original primary system may function as a system at first level (also referred to as a communication system at first level), and the secondary system may function as a system at second level (also referred to as a communication system at second level). A secondary system having no QoS requirement or providing civilian services functions as a system at third level (also referred to as a communication system at third level). That is, systems at different levels have different spectrum use authorities. For example, here, the system at first level has a higher spectrum use authority than the system at second level and the system at third level, the system at second level has a higher spectrum use authority than the system at third level, and the system at third level has the lowest spectrum use authority. Communication systems at various levels within the same predetermined region may be managed by the same spectrum resource management device, and the predetermined region is a management region of the spectrum resource management device.

In such communication mode in which multiple levels of communication systems coexist, it is required that the communication system with lower authority protects the communication system with higher authority, an application of the communication system with lower authority does not interfere with an application of the communication system with higher authority, or influence caused due to spectrum utilization of the communication system with lower authority is controlled within an allowable range of the communication system with higher authority.

Presently, management for systems with multiple levels of spectrum use authorities is implemented by a database. The database stores an allowable interference threshold of the primary system. Before starting to utilize spectrums of the primary system, the secondary system within the same management region firstly accesses the database and submits spectrum utilization characteristic information thereof, for example position information, a spectrum emission mask, a transmission bandwidth and a carrier frequency and the like. Then, the database calculates interference on the primary system caused by the secondary system according to condition information of the secondary system, and calculates available spectrum resources of the secondary system in a case of the current spectrum utilization characteristics according to the calculated interference on the primary system caused by the secondary system in a case of the current spectrum utilization characteristics.

SUMMARY

However, in a case that systems with multiple levels of spectrum use authorities share the spectrum resources, particularly for spectrum use of the system at second level, on the premise of considering protection for the system at first level from the system at second level, it also needs to take interferences from the system at second level, the system at third level and even the system at first level into consideration. Moreover, since it needs to consider aggregation interference on the system at first level caused by the system at second level and the system at third level, an upper limit of available spectrum resources of the system at second level depends on interference on the system at first level from not only the system at second level but also the system at third level. In view of this, the applicant devises the present disclosure. The present disclosure may be extended to a scene in which systems with multiple spectrum use levels coexist.

According to an aspect of the present disclosure, there is provided a spectrum resource management device, which includes: an available resource determining unit configured to determine available spectrum resources of a target communication system, so that when the target communication system operates in a range of the available spectrum resources and a communication system with lower authority within a management region of the spectrum resource management device operates in a range of available spectrum resources of the communication system with lower authority, aggregation interference on a communication system with higher authority within the management region caused by the target communication system and the communication system with lower authority does not exceed an interference threshold of the communication system with higher authority, in which the communication system with higher authority has a higher spectrum use authority than the target communication system and the communication system with lower authority has a lower spectrum use authority than the target communication system; a resource utilization adjusting unit configured to reduce the available spectrum resources of the communication system with lower authority, so that when the communication system with lower authority operates in a range of the reduced available spectrum resources, interference on the target communication system caused by the communication system with lower authority does not exceed an interference threshold of the target communication system; and an available resource updating unit configured to update the available spectrum resources of the target communication system according to the reduced available spectrum resources of the communication system with lower authority, so that when the target communication system operates in a range of the updated available spectrum resources and the communication system with lower authority operates in a range of the reduced available spectrum resources, the aggregation interference does not exceed the interference threshold of the communication system with higher authority.

According to another aspect of the present disclosure, there is provided a spectrum resource management method, which includes: determining available spectrum resources of a target communication system, so that when the target communication system operates in a range of the available spectrum resources and a communication system with lower authority within a current spectrum management region operates in a range of available spectrum resources of the communication system with lower authority, aggregation interference on a communication system with higher authority within the current spectrum management region caused by the target communication system and the communication system with lower authority does not exceed an interference threshold of the communication system with higher authority, in which the communication system with higher authority has a higher spectrum use authority than the target communication system and the communication system with lower authority has a lower spectrum use authority than the target communication system; reducing the available spectrum resources of the communication system with lower authority, so that when the communication system with lower authority operates in a range of the reduced available spectrum resources, interference on the target communication system caused by the communication system with lower authority does not exceed an interference threshold of the target communication system; and updating the available spectrum resources of the target communication system according to the reduced available spectrum resources of the communication system with lower authority, so that when the target communication system operates in a range of the updated available spectrum resources and the communication system with lower authority operates in a range of the reduced available spectrum resources, the aggregation interference does not exceed the interference threshold of the communication system with higher authority.

According to yet another aspect of the present disclosure, there is provided a spectrum resource management device, which includes an interface unit configured to: receive a spectrum utilization request that a target communication system requests utilizing spectrum resources of a communication system with higher authority; provide spectrum utilization characteristics of the target communication system to other spectrum resource management device; and receive, from the other spectrum resource management device, information of corresponding available spectrum resources of the target communication system with respect to the other spectrum resource management device. The spectrum resource management device further includes: an adjustment object determining unit configured to determine other spectrum resource management device involved in spectrum utilization adjustment based on the information of available spectrum resources received by the interface unit. The interface unit is configured to send a spectrum utilization adjustment request to the other spectrum resource management device involved in the spectrum utilization adjustment.

According to another aspect of the present disclosure, there is provided a spectrum resource management method, which includes: receiving a spectrum utilization request that a target communication system requests utilizing spectrum resources of a communication system with higher authority; providing spectrum utilization characteristics of the target communication system to other spectrum resource management device; receiving, from the other spectrum resource management device, information of corresponding available spectrum resources of the target communication system with respect to the other spectrum resource management device; determining other spectrum resource management device involved in spectrum utilization adjustment based on the received information of available spectrum resources; and sending a spectrum utilization adjustment request to the other spectrum resource management device involved in the spectrum utilization adjustment.

According to still another aspect of the present disclosure, there is provided a spectrum resource management device, which includes: an interface unit configured to receive spectrum utilization characteristics of a target communication system managed by other spectrum resource management device; and an available resource determining unit configured to determine current available spectrum resources and spectrum resources estimated to be available after adjusting of the target communication system based on the spectrum utilization characteristics and a spectrum utilization condition of a communication system with lower authority managed by the spectrum resource management device. The available resource determining unit estimates an increment with respect to the available spectrum resources of the target communication system obtained by reducing spectrum utilization of the communication system with lower authority so as to determine the spectrum resources estimated to be available after adjusting. The interface unit is further configured to send the current available spectrum resources and the spectrum resources estimated to be available after adjusting to the other spectrum resource management device.

According to another aspect of the present disclosure, there is provided a spectrum resource management method, which includes: receiving spectrum utilization characteristics of a target communication system managed by other spectrum resource management device; determining current available spectrum resources and spectrum resources estimated to be available after adjusting of the target communication system based on the spectrum utilization characteristics and a spectrum utilization condition of a communication system with lower authority within a current spectrum resource management region; and sending the current available spectrum resources and the spectrum resources estimated to be available after adjusting to other spectrum resource management device. The spectrum resources estimated to be available after adjusting can be determined by estimating an increment with respect to the available spectrum resources of the target communication system obtained by reducing spectrum utilization of the communication system with lower authority.

According to another embodiment of the present disclosure, there is provided a computer storage medium including computer readable instructions, the instructions being used to cause a computer to perform: an available resource determining step of determining available spectrum resources of a target communication system, so that when the target communication system operates in a range of the available spectrum resources and a communication system with lower authority within a current spectrum management region operates in a range of available spectrum resources of the communication system with lower authority, aggregation interference on a communication system with higher authority within the current spectrum management region caused by the target communication system and the communication system with lower authority does not exceed an interference threshold of the communication system with higher authority, in which the communication system with higher authority has a higher spectrum use authority than the target communication system and the communication system with lower authority has a lower spectrum use authority than the target communication system; a resource utilization adjusting step of reducing available spectrum resources of the communication system with lower authority, so that when the communication system with lower authority operates in a range of the reduced available spectrum resources, interference on the target communication system caused by the communication system with lower authority does not exceed an interference threshold of the target communication system; and an available resource updating step of updating the available spectrum resources of the target communication system according to the reduced available spectrum resources of the communication system with lower authority, so that when the target communication system operates in a range of the updated available spectrum resources and the communication system with lower authority operates in a range of the reduced available spectrum resources, the aggregation interference does not exceed the interference threshold of the communication system with higher authority.

According to another embodiment of the present disclosure, there is provided a computer storage medium including computer readable instructions, the instructions being used to cause a computer to: receive a spectrum utilization request that a target communication system requests utilizing spectrum resources of a communication system with higher authority; provide spectrum utilization characteristics of the target communication system to other spectrum resource management device; receive, from the other spectrum resource management device, information of corresponding available spectrum resources of the target communication system with respect to the other spectrum resource management device; determine other spectrum resource management device involved in spectrum utilization adjustment based on the received information of available spectrum resources; and send a spectrum utilization adjustment request to the other spectrum resource management device involved in the spectrum utilization adjustment.

According to another embodiment of the present disclosure, there is provided a computer storage medium including computer readable instructions, the instructions being used to cause a computer to: receive spectrum utilization characteristics of a target communication system managed by other spectrum resource management device; determine current available spectrum resources and spectrum resources estimated to be available after adjusting of the target communication system based on the spectrum utilization characteristics and a spectrum utilization condition of a communication system with lower authority within a current spectrum resource management region; and send the current available spectrum resources and the spectrum resources estimated to be available after adjusting to the other spectrum resource management device. The spectrum resources estimated to be available after adjusting can be determined by estimating an increment with respect to the available spectrum resources of the target communication system obtained by reducing spectrum utilization of the communication system with lower authority.

In the above aspects of the present disclosure, the target communication system is a secondary system in cognitive radio technology. The spectrum resource management device according to the above aspects of the present disclosure may include a database for managing spectrum resource utilization of the secondary system.

With the present disclosure, spectrum use of respective communication systems with lower authorities can be controlled with interference on a communication system with higher authority not exceeding an interference threshold of the communication system with higher authority, so that the target communication system can obtain expected communication QoS.

BRIEF DESCRIPTION OF THE DRAWINGS

Referring to following descriptions of embodiments of the present disclosure in conjunction with drawings, the above and other objects, features and advantages of the present disclosure will be more easily understood. In the drawings, the same or corresponding technical features or components are indicated by the same or corresponding reference numerals.

DETAILED DESCRIPTION OF THE EMBODIMENTS

Figure 1:
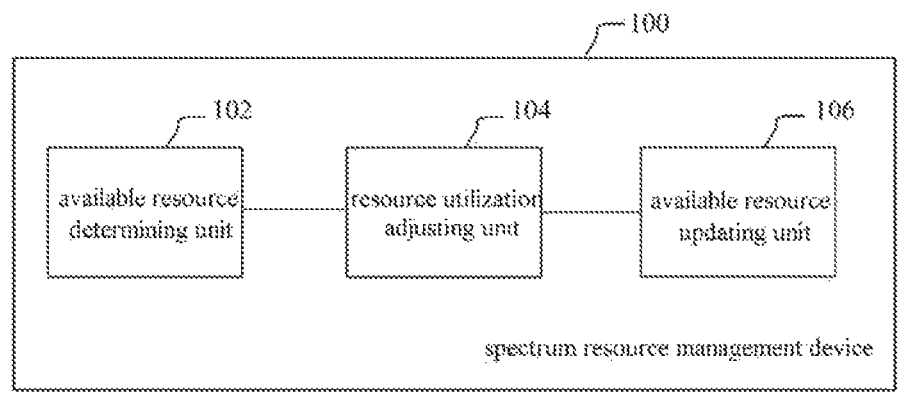
FIG. 1 is a block diagram showing a configuration example of a spectrum resource management device according to an embodiment of the present disclosure.

Hereinafter, embodiments of the present disclosure are illustrated by referring to the drawings. It should be noted that for the purpose of clarity, representations and descriptions of components and processing which are irrelevant to the present disclosure and known by those skilled in the art are omitted in the drawings and specification.

Hereinafter, a configuration of a spectrum resource management device according to an embodiment of the present disclosure is described in conjunction with FIG. 1. FIG. 1 is a block diagram showing a configuration example of a spectrum resource management device according to an embodiment of the disclosure.

As shown in FIG. 1, a spectrum resource management device 100 may include an available resource determining unit 102, a resource utilization adjusting unit 104 and an available resource updating unit 106.

The available resource determining unit 102 may be configured to determine available spectrum resources of a target communication system, so that when the target communication system operates in a range of the available spectrum resources and a communication system with lower authority within a management region of the spectrum resource management device 100 operates in a range of available spectrum resources of the communication system with lower authority, aggregation interference on a communication system with higher authority within the management region caused by the target communication system and the communication system with lower authority does not exceed an interference threshold of the communication system with higher authority. The communication system with higher authority has a higher spectrum use authority than the target communication system, and the communication system with lower authority has a lower spectrum use authority than the target communication system. The available spectrum resources of the communication system with lower authority may be spectrum resources which have been determined for the communication system with lower authority currently.

Herein and below, the target communication system is a secondary system in cognitive radio technology, which operates by opportunistically utilizing unlicensed spectrums for example while making sure that interference on a primary system having conventional use authority for the spectrums is within a tolerable range of the primary system.

Systems with multiple spectrum use levels may exist within the management region of the spectrum resource management device 100 at the same time. That is, the systems with multiple spectrum use levels may coexist.

Figure 2:
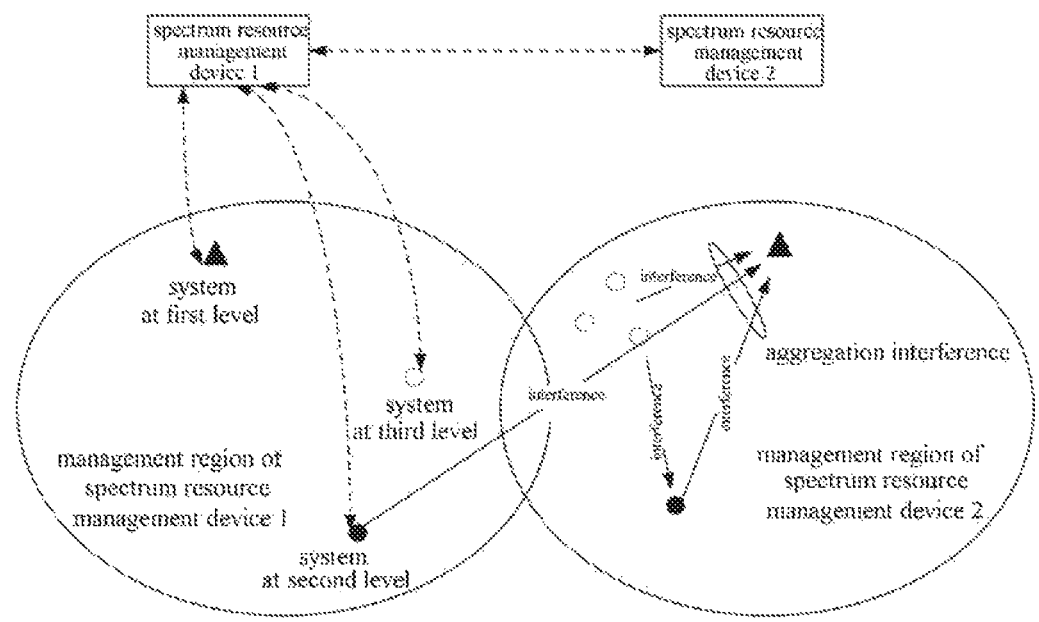
FIG. 2 shows a schematic diagram of a scene in which systems with multiple spectrum use levels coexist according to an embodiment of the present disclosure.

Hereinafter an example of a scene in which systems with multiple spectrum use levels coexist is described in conjunction with FIG. 2. FIG. 2 is a schematic diagram showing a scene in which systems with multiple spectrum use levels coexist according to an embodiment of the present disclosure.

As shown in FIG. 2, there are systems with three spectrum use levels within a management region of a spectrum resource management device 1 or 2. Here, the spectrum resource management device 1 or 2 may be implemented by the spectrum resource management device 100. Particularly, a solid triangle indicates a system at first level, a solid circle indicates a system at second level, and a hollow circle indicates a system at third level. In a specific example, all of the systems at three levels communicate using spectrum resources of broadcast TV frequency bands; the system at first level is for example a broadcast television system having a conventional use authority for the broadcast television frequency band resources (referred to as a primary system in some examples), and the systems at second level and third level are for example a cellular communication system and a wireless fidelity (wifi) system which desire to utilize the broadcast television frequency band resources (referred to as a secondary system in some examples). In another specific example, the system at first level is for example an existing weather radar system, the radar system has an excellent receiver, and hence communication systems around the radar system can use the same frequency band but will suffer interference from the radar system; the system at second level is for example a communication system of a wireless communication operator providing cell services for users by sharing the radar frequency bands, the cell services have communication quality requirements, and hence the spectrum use by the communication system needs to guarantee communication quality on the premise of protecting the radar system; and the system at third level is for example a wifi system sharing the radar frequency bands.

Each of these systems having different spectrum use authorities exchanges data with the spectrum resource management device 1 or 2 within the management region where the system is located. In the management region of the spectrum resource management device 1 or 2, it is assumed that the system at first level has used a certain frequency band and stores spectrum utilization information, for example a position, a coverage range, a position where interference control is needed and a tolerable interference threshold and so on, of the system at first level, in a spectrum resource management device for example a geo-location database (GLDB). The system at second level and the system at third level dynamically access the spectrum resource management device. The spectrum resource management device may calculate available spectrum resources of the system at second level or the system at third level according to interference on the system at first level caused by the system at second level and the system at third level and an interference threshold of the system at first level. Those skilled in the art should understand that various methods may be adopted to calculate available spectrum resources of the secondary system. For example, the available spectrum resources of the secondary system may be calculated using a calculation manner for available spectrum resources of a wireless communication system at a television frequency band as described in reference document 1 (ECC REPORT 159, "TECHNICAL AND OPERATIONAL REQUIREMENTS FOR THE POSSIBLE OPERATION OF CONGNITIVE RADIO SYSTEMS IN THE 'WHITE SPACES' OF THE FREQUENCY BAND 470-790 MHz", Cardiff, January, 2011). Spectrum utilization of the system at second level needs to meet an expected communication QoS. The calculation of communication QoS of the system at second level depends on interference on a target system at second level caused by the system at first level and other systems at second level. The system at third level has no conventional spectrum use authority, and opportunistically uses the spectrum resources without interfering with other systems at higher levels.

In the present disclosure, a specific example in which the system at second level is taken as a target system is described, and for spectrum utilization of the system at second level, it is proposed the spectrum resource management device controls, on the premise that an interference threshold of the system at first level (a communication system with higher authority) is met, spectrum use of the system at second level and the system at third level (communication systems with lower authorities), so that the system at second level obtains expected communication quality. It should be understood that, although an example in which the system at first level is a primary system has been given in the above description, the system at first level may be for example a secondary system having a higher spectrum use authority for the broadcast television frequency band resources, and the device and method according to the embodiment of the present disclosure may be extended to a scene in which systems with more spectrum use levels coexist.

Since systems with multiple levels of spectrum use authorities coexist, systems with respective levels of spectrum use authorities may interfere with each other. Hence, in the above embodiment, when determining the available spectrum resources of the target communication system, it is considered that when the target communication system operates in a range of the available spectrum resources thereof and a communication system with lower authority within the management region of the spectrum resource management device 100 operates in a range of available spectrum resources thereof, aggregation interference on a communication system with higher authority within the management region caused by the target communication system and the communication system with lower authority does not exceed an interference threshold of the communication system with higher authority. It should be understood that, the communication system with lower authority herein is not limited to a single communication system with lower authority, but refers to a set of communication systems with lower authorities. For example, all communication systems at lower levels than the target communication system within the management region of the spectrum resource management device 100 may function as members of the set of communication systems with lower authorities. In addition, if there is other communication system at the same level as the target communication system, the aggregation interference may be calculated by further considering interference from the communication system at the same level. If there is a communication system at other level between the level of the higher level communication system and the level of the target communication system, the aggregation interference may be calculated by further considering interference from the communication system at the other level. Herein and below, the scene to which the present disclosure is applied is simplified as having only three levels of communication systems, so as to avoid obscuring key points and facilitate description.

In addition, in a preferred embodiment of the present disclosure, for the target communication system within the management region of the spectrum resource management device 100 (being an object managed by the management device 100), the spectrum resource management device 100 further controls resource distribution for the target communication system, so that interference on a communication system with higher authority outside the management region caused by the target communication system does not exceed an interference threshold of the communication system with higher authority. For example, aggregation interference on the communication system with higher authority outside the management region caused by the target communication system and a communication system with same or lower authority outside the management region does not exceed the interference threshold of the communication system with higher authority. For example, the spectrum resource management device 100 interacts with a spectrum resource management device in an adjacent region information about the target communication system requesting for resources, for example spectrum utilization characteristics including information indicating levels and so on, acquires, from the spectrum resource management device in the adjacent region, available spectrum resources of the target communication system with protection for a communication system with higher authority within a management region of the spectrum resource management device in the adjacent region, and distributes/adjusts resources based on the available spectrum resources.

For example, in the scene shown in FIG. 2, the spectrum resource management device 2 determines available spectrum resources of a target system at second level. The target system at second level may be a system at second level within the management region of the spectrum resource management device 2, and may also be a system at second level outside the management region of the spectrum resource management device 2, for example a system at second level in the management region of the spectrum resource management device 1. The system at first level suffers aggregation interference from the system at second level and the system at third level. It is assumed that an interference threshold of the system at first level in the management region of the spectrum resource management device 2 is 10 mw, that is, the aggregation interference arriving at the system at first level should not exceed 10 mw. The system at third level in the management region of the spectrum resource management device 2 causes interference of 3 mw on the system at first level, and hence, interference caused by the target system at second level cannot exceed 7 mw. As such, the available spectrum resources of the target system at second level (also referred to as current available spectrum resources hereinafter) may be determined, for example a maximum transmission power is (7 mw×path loss).

Further referring to the scene shown in FIG. 2, if the interference of 3 mw on the system at first level caused by the system at third level is removed, the target system at second level may be allowed to accordingly increase the maximum transmission power by for example 3 mw×path loss. Such an increment is an increment with respect to the available spectrum resources of the target system at second level, which is obtained by removing the interference on the system at first level caused by the system at third level within the management region. That is, in a case the system at third level causes no interference on the system at first level, the maximum transmission power of the target system at second level is 10 mw. As such, maximum available spectrum resources (also referred to as spectrum resources estimated to be available after adjusting) of the target system at second level may be determined.

Since the available spectrum resources of the communication system with lower authority are reduced, interference on the communication system with higher authority caused by the communication system with lower authority is reduced accordingly. In a case that the interference threshold of the communication system with higher authority is constant, interference allowed to be caused by the target communication system may be increased since the interference caused by the communication system with lower authority is reduced. Accordingly, the target communication system may be allowed to use more spectrum resources, thereby increasing the available spectrum resources of the target communication system. As can be seen from above, in the embodiment of the present disclosure, the available spectrum resources of the target communication system may be increased by adjusting (for example reducing or cancelling) the available spectrum resources of the communication system with lower authority. In addition, the spectrum resource management device in the adjacent region may interact with the spectrum resource management device 100 information on the increment, so that the spectrum resource management device 100 determines resource distribution for the target communication system.

Accordingly, the spectrum resource management device 100 may also increase the available spectrum resources of the target communication system by adjusting the available spectrum resources of the communication system with lower authority within the management region thereof in above manner. Returning back to refer to FIG. 1, the resource utilization adjusting unit 104 in the spectrum resource management device 100 may reduce the available spectrum resources of the communication system with lower authority within the management region of the spectrum resource management device 100, so that when the communication system with lower authority operates in a range of the reduced available spectrum resources, interference on the target communication system does not exceed an interference threshold of the target communication system.

The spectrum resource management device 100 may acquire the interference threshold of the target communication system using any appropriate method. For example, the spectrum resource management device 100 may receive the interference threshold from the target communication system or a spectrum resource management device managing the target communication system. Further, for example, the spectrum resource management device 100 may determine the interference threshold of the target communication system by simulating a spectrum resource use condition of the target communication system.

In the device 100, the available resource updating unit 106 may update the available spectrum resources of the target communication system according to the reduced available spectrum resources of the communication system with lower authority, so that when the target communication system operates in a range of the updated available spectrum resources and the communication system with lower authority operates in the range of the reduced available spectrum resources, the aggregation interference on the communication system with higher authority does not exceed the interference threshold of the communication system with higher authority. More specifically, the increment with respect to the available spectrum resources of the target communication system obtained by reducing the available spectrum resources of the communication system with lower authority may be added to the current available spectrum resources of the target communication system. In another embodiment, the available resource updating unit 106 may further update the adjusted (for example the reduced) available spectrum resources of the communication system with lower authority.

In this way, it is possible to increase the available spectrum resources of the target communication system while protecting the target communication system by the communication system with lower authority.

In the above and following embodiments, unless explicitly illustrated, the target communication system may be either a communication system within the management region of the spectrum resource management device 100 or a communication system outside the management region of the spectrum resource management device 100.

In addition to increasing the available spectrum resources of the target communication system by reducing the available spectrum resources of the communication system with lower authority, if an exclusive region is set for the target communication system, the spectrum resource management device may stop a communication system with lower authority in the exclusive region so as to protect the target communication system.

In an embodiment of the present disclosure, the resource utilization adjusting unit 104 may stop a communication system with lower authority within the management region of the spectrum resource management device 100, which operates in an exclusive service region of the target communication system, so as to protect the target communication system.

After the communication system with lower authority in the exclusive service region is stopped, the stopped communication system with lower authority does not interfere with the target communication system any more, and does not interfere with the communication system with higher authority any more either. Accordingly, an increment with respect to the available spectrum resources of the target communication system may be obtained. Hence, the available resource updating unit 106 may update the available spectrum resources of the target communication system according to current available spectrum resources of remaining systems with lower authorities in the management region of the spectrum resource management device 100, so that when the target communication system operates in the range of the updated available spectrum resources and the remaining communication systems with lower authorities operate in ranges of current available spectrum resources thereof, the aggregation interference on the communication system with higher authority does not exceed the interference threshold of the communication system with higher authority.

Since the target communication system has a certain requirement for communication QoS, the available spectrum resources determined for the target communication system need to meet (be equal to or more than, for example) necessary spectrum resources for the target communication system, so that the target communication system can obtain the required QoS when communicating using the available spectrum resources.

In another embodiment of the present disclosure, the resource utilization adjusting unit 104 is further configured to reduce the available spectrum resources of the communication system with lower authority again in a case that the updated available spectrum resources of the target communication system are less than the necessary spectrum resources for the target communication system. The available resource updating unit 106 is further configured to update, in a case that the updated available spectrum resources of the target communication system are less than the necessary spectrum resources for the target communication system, the available spectrum resources of the target communication system again according to the currently reduced available spectrum resources of the communication system with lower authority, so that when the target communication system operates in a range of the currently updated available spectrum resources and the communication system with lower authority operates in a range of the currently reduced available spectrum resources, the aggregation interference on the communication system with higher authority does not exceed the interference threshold of the communication system with higher authority, until the currently updated available spectrum resources of the target communication system are equal to or more than the necessary spectrum resources for the target communication system.

The above and following components of the spectrum resource management device 100 may be integrated in one entity (in a form of hardware, software or a combination of hardware and software), or may be located in multiple entities dispersedly. In some places of the present disclosure, the spectrum resource management device 100 may be referred to as a system. For example, the available resource determining unit 102, the resource utilization adjusting unit 104 and the available resource updating unit 106 may be integrated in a GLDB device conforming to a reconfigurable radio systems standard established by the European Telecommunications Standards Institute (ETSI), for example. Alternatively, the available resource determining unit 102 and the available resource updating unit 106 may be arranged in the GLDB device, while the resource utilization adjusting unit 104 is arranged in other physical/logical entity enabling the secondary system to use unlicensed spectrums, for example arranged in a coexistence manager making coordination decisions for solving a coexistence problem of multiple secondary systems.

The spectrum resource management device 100 may obtain the necessary spectrum resources for the target communication system in various manners. For example, the necessary spectrum resources for the target communication system may be obtained from the target communication system or a spectrum resource management device managing the target communication system. Further, for example, the necessary spectrum resources for the target communication system may be calculated according to interference suffered by the target communication system. Hereinafter an embodiment in which the spectrum resource management device calculates the necessary spectrum resources for the target communication system is described in conjunction with FIG. 3.

Figure 3:
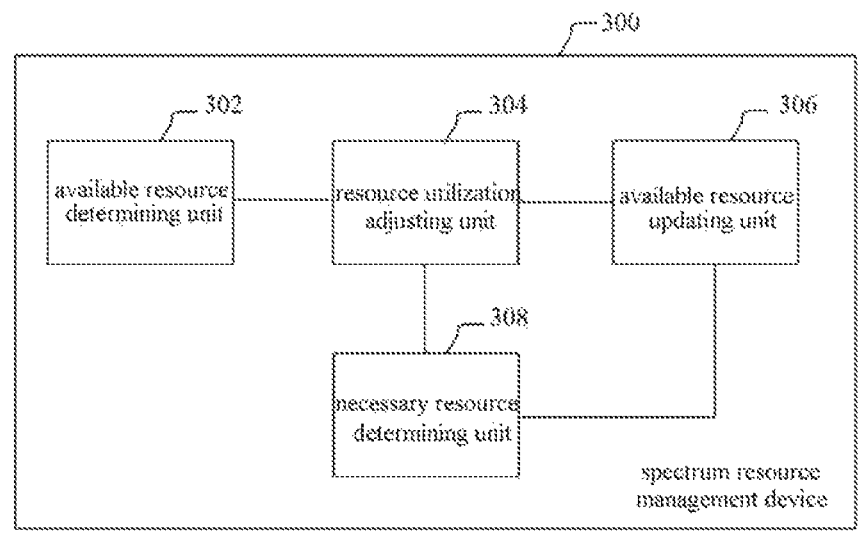
FIG. 3 is a block diagram showing a configuration example of a spectrum resource management device according to another embodiment of the present disclosure.

FIG. 3 is a block diagram showing a configuration example of a spectrum resource management device according to another embodiment of the present disclosure. As shown in FIG. 3, a spectrum resource management device 300 includes an available resource determining unit 302, a resource utilization adjusting unit 304, an available resource updating unit 306 and a necessary resource determining unit 308. Configurations of the available resource determining unit 302, the resource utilization adjusting unit 304 and the available resource updating unit 306 are respectively the same as configurations of the available resource determining unit 102, the resource utilization adjusting unit 104 and the available resource updating unit 106 in the spectrum resource management device 100 shown in FIG. 1, and hence the specific details thereof are not described here. Hereinafter the necessary resource determining unit 308 in the spectrum resource management device 300 is described in detail.

The necessary resource determining unit 308 may calculate the necessary spectrum resources for the target communication system according to interference on the target communication system caused by a communication system with higher authority and a communication system with same authority within a management region of the spectrum resource management device 300 and QoS requirements of the target communication system. Herein, the communication system with same authority refers to a communication system having the same level of spectrum use authority as the target communication system.

The necessary resource determining unit 308 may calculate the necessary spectrum resources for the target communication system using various existing appropriate methods. As an example but not limitation, for example, a necessary signal transmission power for edges of a service range of the target communication system may be calculated according to the interference on the target communication system caused by the communication system with higher authority and the communication system with same authority, and the QoS requirements of the target communication system, for example a necessary signal to interference plus noise ratio for the edges of the service range of the target communication system, and a necessary minimum transmission power for a transmitter of the target communication system may be calculated according to the signal transmission power and a path loss from the target communication system to the edges of the service range thereof.

As can be seen from above, the interference on the target communication system caused by the communication system with higher authority and the communication system with same authority will influence the necessary spectrum resources for the target communication system. Hence, in a case that the necessary spectrum resources for the target communication system cannot be met by reducing the available spectrum resources of the communication system with lower authority to increase the available spectrum resources of the target communication system, it may be considered that the necessary spectrum resources for the target communication system may be reduced by reducing interference on the target communication system caused by the communication system with same authority. The communication system with higher authority has a higher spectrum resource use authority than the target communication system, and hence it is impossible to adjust spectrum use of the communication system with higher authority to reduce interference on the target communication system. Hereinafter an embodiment in which the spectrum resource management device increases the available spectrum resources of the target communication system by adjusting interference on the target communication system caused by the communication system with same authority is described in conjunction with FIG. 4 and FIG. 5.

Figure 4:
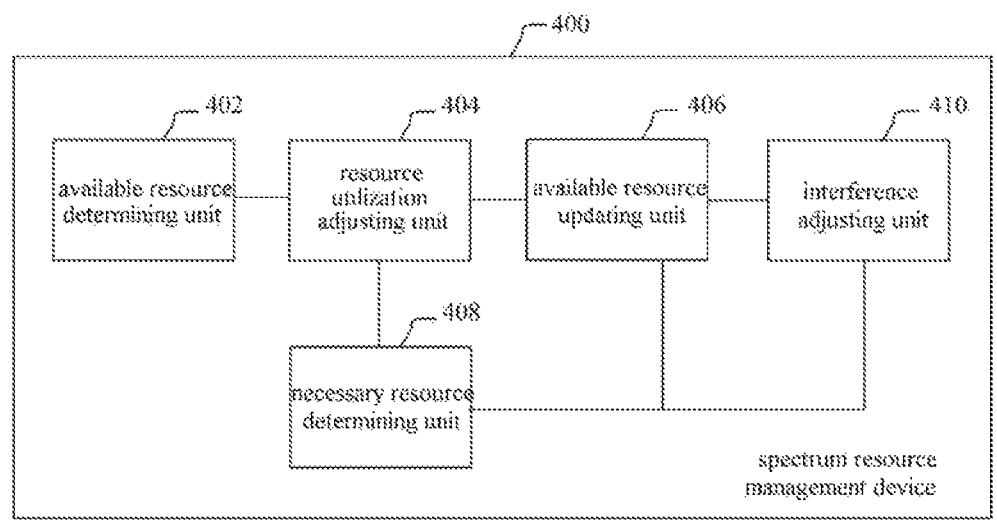
FIG. 4 is a block diagram showing a configuration example of a spectrum resource management device according to another embodiment of the present disclosure.

FIG. 4 is a block diagram showing a configuration example of a spectrum resource management device according to another embodiment of the present disclosure. As shown in FIG. 4, a spectrum resource management device 400 includes an available resource determining unit 402, a resource utilization adjusting unit 404, an available resource updating unit 406, a necessary resource determining unit 408 and an interference adjusting unit 410. Configurations of the available resource determining unit 402, the resource utilization adjusting unit 404 and the available resource updating unit 406 are respectively the same as configurations of the available resource determining unit 102, the resource utilization adjusting unit 104 and the available resource updating unit 106 in the spectrum resource management device 100 shown in FIG. 1, and hence the specific details thereof are not described here. Hereinafter, the necessary resource determining unit 408 and the interference adjusting unit 410 in the spectrum resource management device 400 are described in detail.

The interference adjusting unit 410 may reduce, in a case that currently updated available spectrum resources are still less than the necessary spectrum resources for the target communication system, interference on the target communication system caused by other communication system with same authority within a management region of the spectrum resource management device 400.

The interference adjusting unit 410 may reduce the interference on the target communication system caused by the other communication system with same authority using various existing appropriate methods. In an example, the interference adjusting unit 410 may reduce mutual interference between the target communication system and the other communication system with same authority using the existing coexistence technology. For example, the interference adjusting unit 410 may send a spectrum use time period to the other communication system with same authority to provide synchronization information. On the basis of synchronization, spectrum use of the target communication system and the other communication system with same authority are coordinated to reduce the mutual interference. The interference adjusting unit 410 may determine spectrum resource use strategies between the target communication system and the other system with same authority according to the numbers, available spectrum resources, and ranges of use regions of spectrum resource regions, of the target communication system and the other communication system with same authority, so as to reduce or avoid interference between the target communication system and the communication system with same authority. In addition, by way of example but not limitation, the spectrum resource management device may calculate the interference between the target communication system and the communication system with same authority using a predetermined system application model.

The necessary resource determining unit 408 may recalculate the necessary spectrum resources for the target communication system according to the interference on the target communication system caused by a communication system with higher authority and the communication system with same authority within the management region of the spectrum resource management device 400 and QoS requirements of the target communication system. The necessary resource determining unit 408 may have the same configuration as the necessary resource determining unit 308 in the spectrum resource management device 300 in FIG. 3, and hence the specific details thereof are not described here.

In the embodiment shown in FIG. 4, after the available spectrum resources of the communication system with lower authority are adjusted, it is considered whether to adjust the interference on the target communication system caused by the communication system with same authority. Hereinafter an embodiment in which it is considered whether to adjust the interference on the target communication system caused by the communication system with same authority before the available spectrum resources of the communication system with lower authority are adjusted is described in conjunction with FIG. 5.

Figure 5:
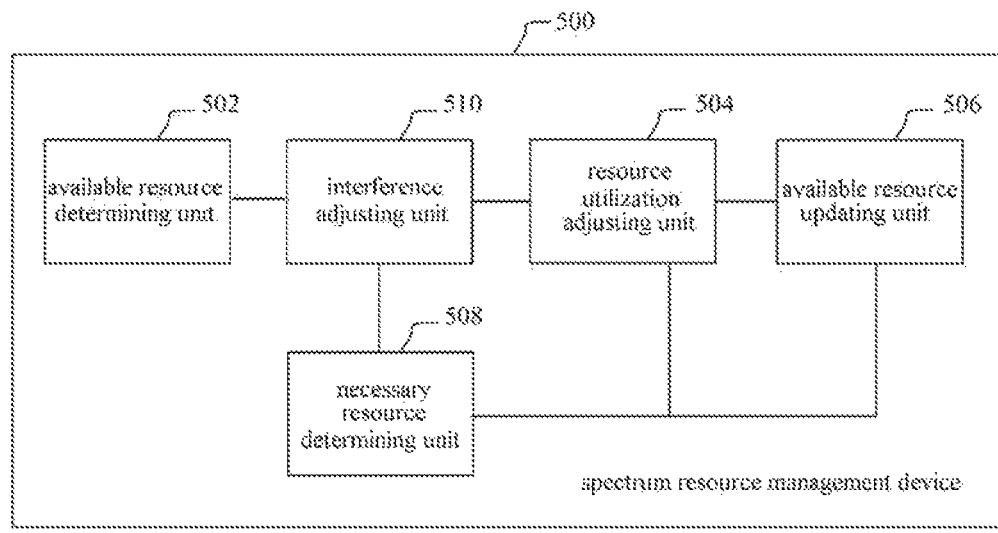
FIG. 5 is a block diagram showing a configuration example of a spectrum resource management device according to another embodiment of the present disclosure.

FIG. 5 is a block diagram showing a configuration example of a spectrum resource management device according to another embodiment of the present disclosure. As shown in FIG. 5, a spectrum resource management device 500 includes an available resource determining unit 502, a resource utilization adjusting unit 504, an available resource updating unit 506, a necessary resource determining unit 508 and an interference adjusting unit 510. Configurations of the resource utilization adjusting unit 504 and the available resource updating unit 506 are respectively the same as configurations of the resource utilization adjusting unit 104 and the available resource updating unit 106 in the spectrum resource management device 100 shown in FIG. 1, and hence the specific details thereof are not described here. Hereinafter the available resource determining unit 502, the necessary resource determining unit 508 and the interference adjusting unit 510 in the spectrum resource management device 500 are described in detail.

In addition to having the same configuration as the available resource determining unit 102 in the spectrum resource management device 100 shown in FIG. 1, the available resource determining unit 502 is further configured to determine, before the resource utilization adjusting unit 504 reduces the available spectrum resources of the communication system with lower authority, maximum available spectrum resources (spectrum resources estimated to be available after adjusting) of the target communication system in a case that the communication system with lower authority does not interfere with the communication system with higher authority. As can be seen from above, in a case that the communication system with lower authority does not interfere with the communication system with higher authority, a maximum increment with respect to the available spectrum resources of the target communication system may be obtained. The determined maximum available spectrum resources of the target communication system are equal to a sum of the available spectrum resources of the target communication system initially determined by the available resource determining unit 502 (for example, the available spectrum resources of the target communication system determined by the available resource determining unit 102 described above) and the maximum increment.

The interference adjusting unit 510 may reduce, in a case that the maximum available spectrum resources of the target communication system are less than the necessary spectrum resources for the target communication system, the interference on the target communication system caused by the communication system with same authority within the management region of the spectrum resource management device 500. The interference adjusting unit 510 may have the same configuration as the interference adjusting unit 410 in the spectrum resource management device 400 shown in FIG. 4, and hence the specific details thereof are not described here.

The necessary resource determining unit 508 may recalculate the necessary spectrum resources for the target communication system according to the interference on the target communication system caused by the communication system with higher authority and the communication system with same authority within the management region of the spectrum resource management device 500 and QoS requirements of the target communication system. The necessary resource determining unit 508 may have the same configuration as the necessary resource determining unit 308 in the spectrum resource management device 300 shown in FIG. 3, and hence the specific details thereof are not described here.

In another embodiment of the present disclosure, the spectrum resource management device may further include an interface unit configured to communicate with other devices such as the target communication system. Hereinafter an embodiment of a spectrum resource management device having an interface unit is described in conjunction with FIG. 6.

Figure 6:
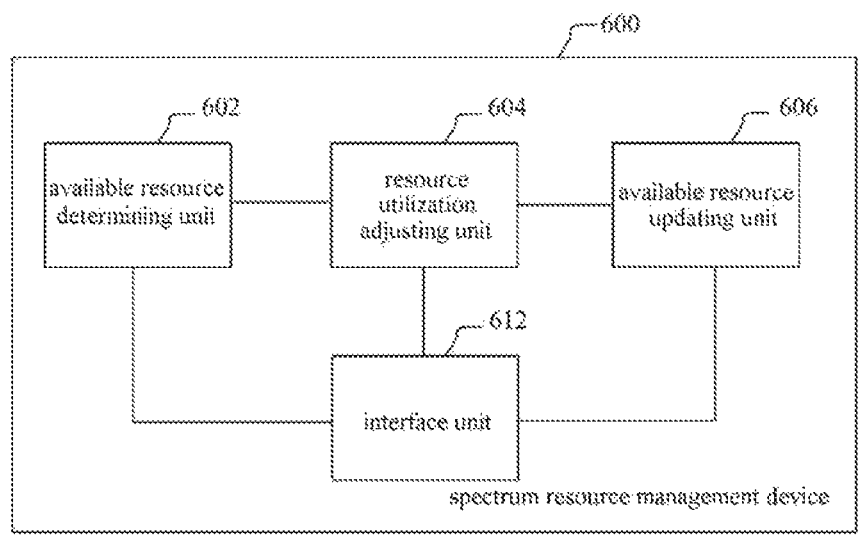
FIG. 6 is a block diagram showing a configuration example of a spectrum resource management device according to another embodiment of the present disclosure.

FIG. 6 is a block diagram showing a configuration example of a spectrum resource management device according to another embodiment of the present disclosure. As shown in FIG. 6, a spectrum resource management device 600 includes an available resource determining unit 602, a resource utilization adjusting unit 604, an available resource updating unit 606 and an interface unit 612. Configurations of the available resource determining unit 602, the resource utilization adjusting unit 604 and the available resource updating unit 606 are respectively the same as configurations of the available resource determining unit 102, the resource utilization adjusting unit 104 and the available resource updating unit 106 in the spectrum resource management device 100 shown in FIG. 1, and hence the specific details thereof are not described here. Hereinafter the interface unit 612 in the spectrum resource management device 600 is described in detail.

In a case that the target communication system is located within a management region of the spectrum resource management device 600, the interface unit 612 may receive a spectrum utilization request from the target communication system. The spectrum utilization request may include spectrum utilization characteristics of the target communication system, for example one or more of position information, a spectrum emission mask, a transmission bandwidth, a carrier frequency, an interference threshold, a QoS requirement (indicating a spectrum use authority) and necessary spectrum resources and the like of the target communication system.

In addition, in a case that the target communication system is located within the management region of the spectrum resource management device 600, the interface unit 612 may further send information of available spectrum resources finally distributed for the target communication system by the spectrum resource management device 600 to the target communication system. For example, the interface unit 612 may send information of available spectrum resources updated by the available resource updating unit 606 to the target communication system.

In a case that the target communication system is located outside the management region of the spectrum resource management device 600, the interface unit 612 may receive from a spectrum resource management device managing the target communication system the spectrum utilization characteristics of the target communication system, for example one or more of position information, a spectrum emission mask, a transmission bandwidth, a carrier frequency, a QoS requirement (indicating a spectrum use authority) and necessary spectrum resources and the like of the target communication system.

In addition, in a case that the target communication system is located outside the management region of the spectrum resource management device 600, the interface unit 612 may further send information of available spectrum resources finally distributed for the target communication system by the spectrum resource management device 600 to the spectrum resource management device managing the target communication system. For example, the interface unit 612 may send information of available spectrum resources updated by the available resource updating unit 606 to the spectrum resource management device managing the target communication system.

In another embodiment of the present disclosure, in a case that there are multiple spectrum management regions, the spectrum resource management device 600 may operate in cooperation with a spectrum resource management device corresponding to other management region via the interface unit 612, so that the determined available spectrum resources of the target communication system with respect to respective spectrum management regions can meet the communication QoS requirements of the target system. Hereinafter various possible configurations of the interface unit 612 in the spectrum resource management device 600 in the embodiment are described.

In a case that the target communication system is located within the management region of the spectrum resource management device 600, the interface unit 612 may receive, from other spectrum resource management device, current available spectrum resources of the target communication system with respect to other spectrum resource management device and a maximum increment with respect to the current available spectrum resources of the target communication system which is obtained by reducing available spectrum resources of the communication system with lower authority managed by the other spectrum resource management device. As can be seen from the above, the maximum increment with respect to the available spectrum resources of the target communication system may be obtained in a case that the communication system with lower authority managed by the other spectrum resource management device does not interfere with the communication system with higher authority managed by the other spectrum resource management device.

Alternatively, in another embodiment, the interface unit 612 may receive, from other spectrum resource management device, current available spectrum resources of the target communication system with respect to the other spectrum resource management device, and maximum available spectrum resources (also referred to as spectrum resources estimated to be available after adjusting) of the target communication system in a case that the communication system with lower authority within the management region does not interfere with the communication system with higher authority within the management region. As described above, the maximum available spectrum resources may be obtained by adding the current available spectrum resources of the target communication system with respect to the other spectrum resource management device and the maximum increment with respect to the current available spectrum resources of the target communication system obtained by reducing the available spectrum resources of the communication system with lower authority managed by the other spectrum resource management device.

In a case that the target communication system is located within the management region of the spectrum resource management device 600, the interface unit 612 may send a spectrum utilization adjustment request to other spectrum resource management device involved in spectrum utilization adjustment. The spectrum utilization adjustment request may include information of the necessary spectrum resource for the target communication system. The spectrum utilization adjustment request may further include information of the required QoS of the target communication system.

In a case that the current available spectrum resources received from the other spectrum resource management device are less than the necessary spectrum resources for the target communication system and a sum of the current available spectrum resources and the maximum increment (i.e., the maximum available resources or the spectrum resources estimated to available after adjusting of the target communication system) which are received from the other spectrum resource management device is equal to or more than the necessary spectrum resources for the target communication system, it is determined that the other spectrum resource management device needs to be involved in the spectrum utilization adjustment. The spectrum utilization adjustment request is sent to the other spectrum resource management device, so that the other spectrum resource management device adjusts available spectrum resources of the communication system with lower authority within the management region thereof, thereby increasing the available spectrum resources of the target communication system with respect to the other spectrum resource management device to meet the communication QoS requirements of the target communication system.

In addition, the interface unit 612 may further send the spectrum utilization adjustment request to all other spectrum resource management devices (including the other spectrum resource management device involved in the spectrum utilization adjustment). The spectrum utilization adjustment request may include information of the necessary spectrum resources for the target communication system. The spectrum utilization adjustment request may further include information of the required QoS of the target communication system. When receiving the spectrum utilization adjustment request, all the other spectrum resource management devices may reduce available spectrum resources of the communication systems with lower authorities within the management regions thereof, so that when the communication systems with lower authorities operate in ranges of the reduced available spectrum resources, interference on the target communication system does not exceed the interference threshold of the target communication system, so as to protect the target communication system. The spectrum resource management device 600 also reduces the available spectrum resources of the communication system with lower authority within the management region thereof, so that when the communication systems with lower authorities operate in the ranges of the reduced available spectrum resources, interference on the target communication system does not exceed the interference threshold of the target communication system, so as to protect the target communication system. In addition, for the other spectrum resource management device determined to be involved in the spectrum utilization adjustment described above, in a case that the current available spectrum resources that can be provided for the target communication system by the other spectrum resource management device are still less than the necessary spectrum resources for the target communication system after the target communication system is protected in the above manner, the other spectrum management device may reduce the available spectrum resources of the communication system with lower authority within the management region thereof again, and update the available spectrum resources of the target communication system again according to the currently reduced available spectrum resources of the communication system with lower authority, so that when the target communication system operates in a range of the currently updated available spectrum resources and the communication system with lower authority operates in a range of the currently reduced available spectrum resources, the aggregation interference on the communication system with higher authority within the management region does not exceed the interference threshold of the communication system with higher authority; and the above operations are repeated as needed until the currently updated available spectrum resources of the target communication system are equal to or more than the necessary spectrum resources for the target communication system.

In a case that the target communication system is located within the management region of the spectrum resource management device 600, the interface unit 612 may further receive the updated current available spectrum resources of the target communication system from the other spectrum resource management device involved in the spectrum utilization adjustment.

In a case that the target communication system is located within the management region of the spectrum resource management device 600, the interface unit 612 may further receive, from the other spectrum resource management device, information of corresponding interference on the target communication system caused by the communication system with higher authority and the communication system with same authority managed by the other spectrum management device.

In a case that the target communication system is located within the management region of the spectrum resource management device 600, the interface unit 612 may further send an interference adjustment request to the other spectrum resource management device involved in interference adjustment. In a case that the sum of the current available spectrum resources and the maximum increment which are received from the other spectrum resource management device is less than the necessary spectrum resources for the target communication system, it is indicated that the necessary spectrum resource for the target communication system cannot be met through only spectrum utilization adjustment, and it is determined that the other spectrum resource management device needs to be involved in the interference adjustment. The interference adjustment request is sent to the other spectrum resource management device, so that the other spectrum resource management device adjusts interference on the target communication system caused by the communication system with same authority within the management region thereof.

In another embodiment, in a case that a sum of the current available spectrum resources and the maximum increment which are received from any other spectrum resource management device is less than the necessary spectrum resources for the target communication system, the spectrum resource management device 600 may determine all other spectrum resource management devices and itself as spectrum resource management devices to be involved in the interference adjustment, and may send the inference adjustment request to all the other spectrum resource management devices. The other spectrum resource management devices, upon receiving the interference adjustment request, may reduce interference on the target communication system caused by the communication systems with same authorities within the management regions thereof according to the interference adjustment request. In this case, the spectrum resource management device 600 may also reduce interference on the target communication system caused by the communication system with same authority within the management region thereof.

The interface unit 612 may further receive, from the other spectrum resource management devices involved in the interference adjustment, information of adjusted interference on the target communication system caused by the communication systems with higher authorities and the communication systems with same authorities managed by the other spectrum resource management devices.

The spectrum resource management device 600 may further include a necessary resource determining unit (not shown). The necessary resource determining unit is configured to recalculate, after the interference adjustment, the necessary spectrum resources for the target communication system according to interference on the target communication system caused by the communication systems with higher authorities and the communication systems with same authorities within all management regions of respective spectrum resource management devices operating in cooperation with each other and the QoS requirements of the target communication system, so as to obtain necessary spectrum resources less than initial necessary spectrum resources for the target communication system. Accordingly, spectrum resource management devices involved in the spectrum utilization adjustment may be determined according to the recalculated necessary spectrum resources.

Figure 7:
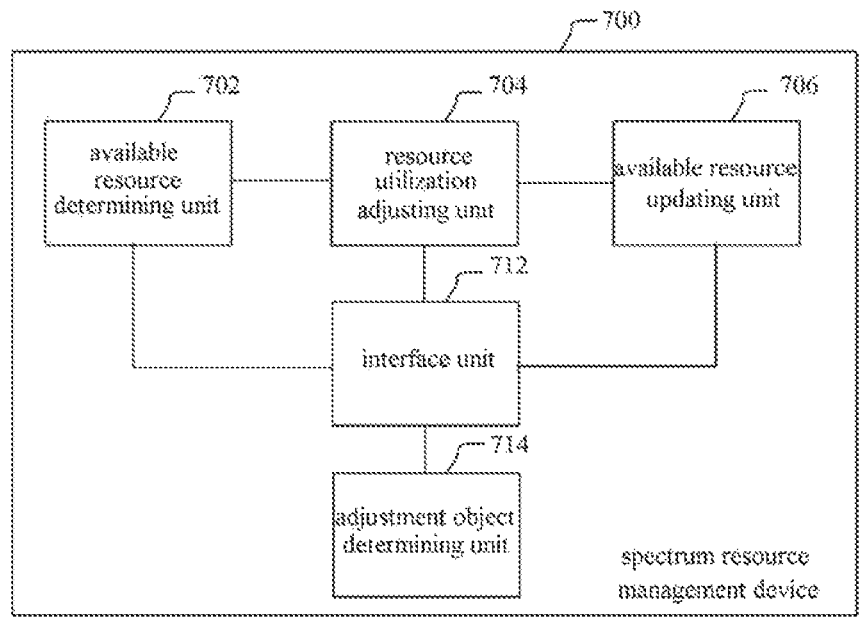
FIG. 7 is a block diagram showing a configuration example of a spectrum resource management device according to another embodiment of the present disclosure.

In another embodiment of the present disclosure, the spectrum resource management device may further include an adjustment object determining unit configured to determine the spectrum resource management device involved in spectrum utilization adjustment and the spectrum resource management device involved in interference adjustment. FIG. 7 is a block diagram showing a configuration example of a spectrum resource management device according to another embodiment of the present disclosure. As shown in FIG. 7, a spectrum resource management device 700 includes an available resource determining unit 702, a resource utilization adjusting unit 704, an available resource updating unit 706, an interface unit 712 and an adjustment object determining unit 714. Configurations of the available resource determining unit 702, the resource utilization adjusting unit 704, the available resource updating unit 706 and the interface unit 712 are respectively the same as configurations of the available resource determining unit 602, the resource utilization adjusting unit 604, the available resource updating unit 606 and the interface unit 612 in the spectrum resource management device 600 shown in FIG. 6, and hence the specific details thereof are not described here. The adjustment object determining unit 714 may determine other spectrum resource management device, for which the current available spectrum resources received therefrom are less than the necessary spectrum resources for the target communication system and a sum of the current available spectrum resources and the maximum increment received therefrom is equivalent to or more than the necessary spectrum resources for the target communication system, as the spectrum resource management device involved in the spectrum utilization adjustment. The adjustment object determining unit 714 may further determine other spectrum resource management device, for which a sum of the current available spectrum resources and the maximum increment received therefrom is less than the necessary spectrum resources for the target communication system, as the spectrum resource management device involved in the interference adjustment. Alternatively, in a case that a sum of the current available spectrum resources and the maximum increment received from any other spectrum resource management device is less than the necessary spectrum resources for the target communication system, the adjustment object determining unit 714 may further determine all spectrum resource management devices (including all other spectrum resource management devices and itself) as the spectrum resource management devices involved in the interference adjustment.

Corresponding to the case that the target communication system is located within the management region of the spectrum resource management device 600, in a case that the target communication system is located outside the management region of the spectrum resource management device 600, the interface unit 612 may further, in addition to receiving the spectrum utilization characteristics of the target communication system managed by the other spectrum resource management device, for example one or more of position information, a spectrum emission mask, a transmission bandwidth, a carrier frequency, an interference threshold, a QoS requirement and necessary spectrum resources and so on of the target communication system, send the current available spectrum resources of the target communication system and a maximum increment with respect to the current available spectrum resources of the target communication system obtained by reducing available spectrum resources of the communication system with lower authority within the management region of the spectrum resource management device 600 to the other spectrum resource management device. For example, the current available spectrum resources may be available spectrum resources determined by the available resource determining unit 602 in the spectrum resource management device 600. The available resource determining unit 602 may be further configured to determine the maximum increment of the current available spectrum resources. As can be seen from above, the maximum increment with respect to the available spectrum resources of the target communication system can be obtained in a case that the communication system with lower authority managed by the spectrum resource management device 600 does not interfere with the communication system with higher authority.

Alternatively, in another embodiment, the interface unit 612 may further send the current available spectrum resources of the target communication system with respect to the other spectrum resource management device, and maximum available spectrum resources (also referred to as spectrum resources estimated to be available after adjusting) of the target communication system in a case that the communication system with lower authority within the management region of the spectrum resource management device 600 does not interfere with the communication system with higher authority within the management region, to the other spectrum resource management device. As described above, the maximum available spectrum resources may be obtained by adding the current available spectrum resources of the target communication system with respect to the other spectrum resource management device and the maximum increment with respect to the current available spectrum resources of the target communication system obtained by reducing the available spectrum resources of the communication system with lower authority within the management region.

In a case that the target communication system is located outside the management region of the spectrum resource management device 600, the interface unit 612 may further send information of corresponding interference on the target communication system caused by the communication system with higher authority and the communication system with same authority within the management region of the spectrum resource management device 600, to the other spectrum resource management device.

In a case that the target communication system is located outside the management region of the spectrum resource management device 600, the interface unit 612 may further receive a spectrum utilization adjustment request from the other spectrum resource management device. Accordingly, the resource utilization adjusting unit 604 in the spectrum resource management device 600 may reduce the available spectrum resources of the communication system with lower authority within the management region according to the spectrum utilization adjusting request. The available resource updating unit 606 in the spectrum resource management device 600 may update the current available spectrum resources of the target communication system according to the adjusted available spectrum resources of the communication system with lower authority, so that when the communication system with lower authority operates in a range of the reduced available spectrum resources, interference on the target communication system does not exceed the interference threshold of the target communication system so as to protect the target communication system. In a case that the updated current available spectrum resources of the target communication system are still less than the necessary spectrum resources for the target communication system, the available resource updating unit 606 in the spectrum resource management device 600 may reduce the available spectrum resources of the communication system with lower authority within the management region of the spectrum resource management device 600 again, and update the available spectrum resources of the target communication system again according to the currently reduced available spectrum resources of the communication system with lower authority, so that when the target communication system operates in a range of currently updated available spectrum resources and the communication system with lower authority operates in a range of the currently reduced available spectrum resources, the aggregation interference on the communication system with higher authority within the management region does not exceed the interference threshold of the communication system with higher authority; and the above operations are repeated as needed, until the currently updated available spectrum resources of the target communication system are equal to or more than the necessary spectrum resources for the target communication system.

In a case that the target communication system is located outside the management region of the spectrum resource management device 600, the interface unit 612 may further send the updated current available spectrum resources of the target communication system to the other spectrum resource management device.

In a case that the target communication device is located outside the management region of the spectrum resource management device 600, the interface unit 612 may further receive an interference adjustment request from the other spectrum resource management device. Accordingly, the spectrum resource management device 600 may further include an interference adjusting unit (not shown) configured to reduce interference on the target communication system caused by the communication system with same authority within the management region according to the interference adjustment request.

In a case that the target communication system is located outside the management region of the spectrum resource management device 600, the interface unit 612 may further send information of adjusted interference on the target communication system caused by the communication system with same authority within the management region to the other spectrum resource management device.

In another embodiment of the present disclosure, in a case that the target communication system is located outside the management region of the spectrum resource management device 600, the interface unit 612 may further send information of available spectrum resources finally distributed for the target communication system by the spectrum resource management device 600 to a spectrum resource managing device managing the target communication system. For example, the spectrum resource management device 600 may perform, according to information of the necessary spectrum resources in the spectrum utilization characteristics of the target system received from the other spectrum resource management device, and the current available spectrum resources that can be provided for the target communication system by the spectrum resource management device 600 and a maximum increment thereof which are determined by the available resource determining unit 602 of the spectrum resource management device 600, spectrum utilization adjustment and/or interference adjustment on use of spectrum resources within the management region of the spectrum resource management device 600, so as to determine the available spectrum resources finally distributed for the target communication system by the spectrum resource management device 600.

More configurations may be further provided for the interface unit 612 according to the design requirements, which are not described in detail here.

Figure 8:
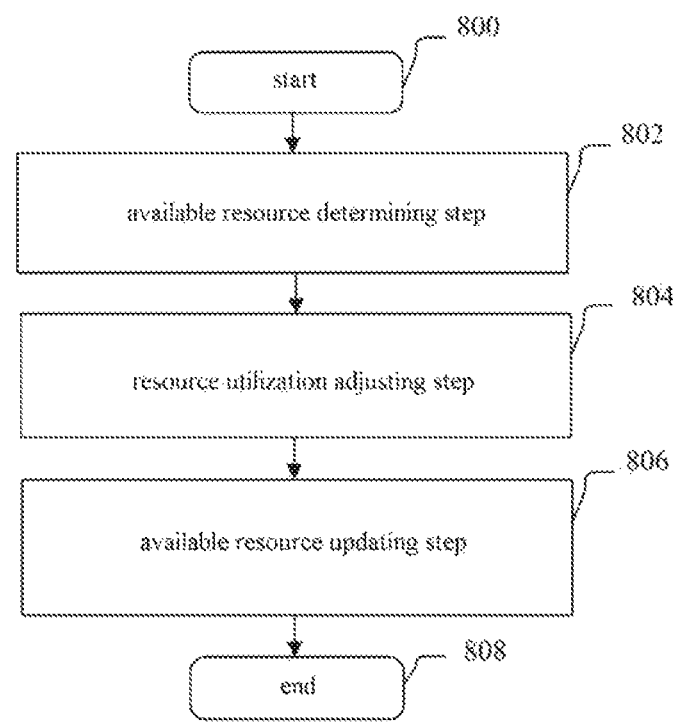
FIG. 8 is a schematic flowchart showing a spectrum resource management method according to an embodiment of the present disclosure.

Hereinafter a spectrum resource management method according to an embodiment of the present disclosure is described in conjunction with FIG. 8. FIG. 8 is a schematic flowchart showing a spectrum resource management method according to an embodiment of the present disclosure.

As shown in FIG. 8, the method starts from step 800. After step 800, the method proceeds to step 802.

Step 802 is an available resource determining step. In step 802, available spectrum resources of a target communication system may be determined, so that when the target communication system operates in a range of the available spectrum resources and a communication system with lower authority within a current spectrum management region operates in a range of available spectrum resources of the communication system with lower authority, aggregation interference on a communication system with higher authority within the current spectrum management region caused by the target communication system and the communication system with lower authority does not exceed an interference threshold of the communication system with higher authority. Here, the communication system with higher authority has a higher spectrum use authority than the target communication system, and the communication system with lower authority has a lower spectrum use authority than the target communication system. The current spectrum management region is a region where the method is implemented. With this method, spectrum resource management is performed on communication systems with multiple levels of spectrum use authorities within the current spectrum management region.

After step 802, the method proceeds to step 804.

Step 804 is a resource utilization adjusting step. In step 804, the available spectrum resources of the communication system with lower authority within the current spectrum management region may be reduced, so that when the communication system with lower authority operates in a range of the reduced available spectrum resources, interference on the target communication system caused by the communication system with lower authority does not exceed an interference threshold of the target communication system.

After step 804, the method proceeds to step 806.

Step 806 is an available resource updating step. In step 806, the available spectrum resources of the target communication system may be updated according to the reduced available spectrum resources of the communication system with lower authority, so that when the target communication system operates in a range of the updated available spectrum resources and the communication system with lower authority operates in a range of the reduced available spectrum resources, the aggregation interference on the communication system with higher authority within the current spectrum management region does not exceed the interference threshold of the communication system with higher authority.

Then, the method ends in step 808.

The spectrum resource management method shown in FIG. 8 corresponds to the spectrum resource management device shown in FIG. 1, and the specific details thereof are not described here.

Hereinafter a configuration of a spectrum resource management device according to another embodiment of the present disclosure is described in conjunction with FIG. 9

Figure 9:
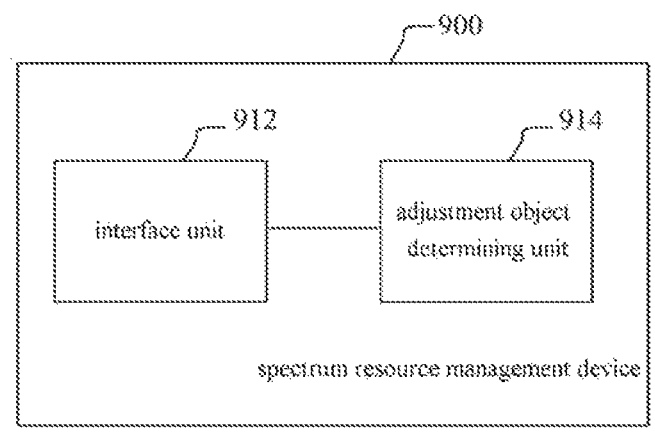
FIG. 9 is a block diagram showing a configuration example of a spectrum resource management device according to another embodiment of the present disclosure.

FIG. 9 is a block diagram showing a configuration example of a spectrum resource management device according to another embodiment of the present disclosure.

As shown in FIG. 9, a spectrum resource management device 900 includes an interface unit 912 and an adjustment object determining unit 914.

The interface unit 912 may receive a spectrum utilizing request that a target communication system requests utilizing spectrum resources of a communication system with higher authority. The interface unit 912 may further provide spectrum utilization characteristics of the target communication system to other spectrum resource management device. The interface unit 912 may receive from the other spectrum resource management device information of corresponding available spectrum resources of the target communication system with respect to the other spectrum resource management device.

The adjustment object determining unit 914 may be configured to determine other spectrum resource management device involved in spectrum utilization adjustment based on the information of available spectrum resources received by the interface unit 912.

The interface unit 912 may be further configured to send a spectrum utilization adjustment request to the other spectrum resource management device involved in the spectrum utilization adjustment.

In an embodiment, the spectrum utilization adjustment request may include information of necessary spectrum resources for the target communication system.

In an embodiment, the interface unit 912 may receive, from the other spectrum resource management device, information of interference on the target communication system caused by a communication system with higher authority and a communication system with same authority managed by the other spectrum resource management device.

Figure 10:
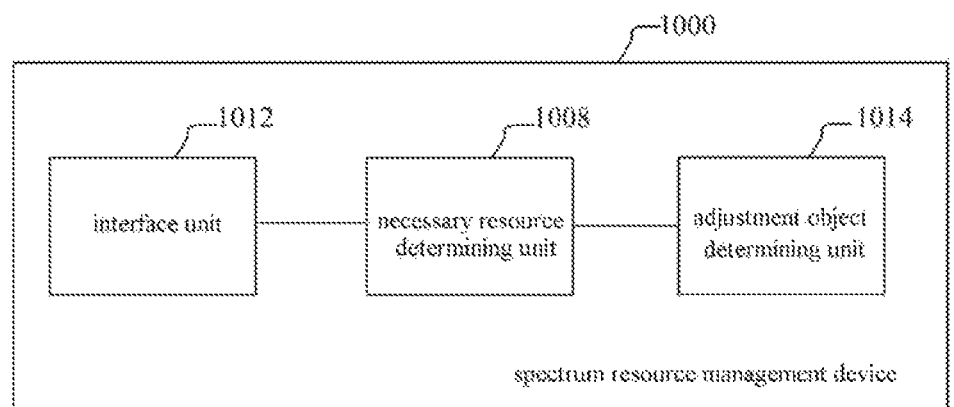
FIG. 10 is a block diagram showing a configuration example of a spectrum resource management device according to another embodiment of the present disclosure.

FIG. 10 is a block diagram showing a configuration example of a spectrum resource management device according to another embodiment of the present disclosure. As shown in FIG. 10, a spectrum resource management device 1000 includes an interface unit 1012, an adjustment object determining unit 1014 and a necessary resource determining unit 1008. Configurations of the interface unit 1012 and the adjustment object determining unit 1014 are respectively the same as configurations of the interface unit 912 and the adjustment object determining unit 914 in the spectrum resource management device 900 shown in FIG. 9, and hence the specific details thereof are not described here. Hereinafter the necessary resource determining unit 1008 in the spectrum resource management device 1000 is described in detail.

The necessary resource determining unit 1008 may determine information of necessary spectrum resources for the target communication system based on information of the required QoS of the target communication system and interference information received by the interface unit 1012. The information of QoS may be included in the spectrum utilization request received by the interface unit 1012.

In an embodiment, the information of corresponding available spectrum resources received by the interface unit 1012 may include information of current available spectrum resources and available spectrum resources estimated to be available after adjusting. In another embodiment, the information of corresponding available spectrum resources received by the interface unit 1012 may also include current available spectrum resources of the target communication system with respect to other spectrum resource management device and an increment with respect to the current available spectrum resources of the target communication system obtained by reducing available spectrum resources of a communication system with lower authority managed by the other spectrum resource management device. Accordingly, the interface unit 1012 or any other component in the spectrum resource management device 1000 may calculate, according to the information of corresponding available spectrum resources, information of the spectrum resources estimated to be available after adjusting of the target communication system with respect to the other spectrum resource management device. Specifically, the information of the spectrum resources estimated to available after adjusting may be a sum of the current available spectrum resources and the increment.

In an embodiment, in a case that the current available spectrum resources with respect to other spectrum resource management device are less than the necessary spectrum resources for the target communication system while the spectrum resources estimated to be available after adjusting are equivalent to or more than the necessary spectrum resources for the target communication system, the adjustment object determining unit 1014 may determine the other spectrum management system as other spectrum resource management device involved in spectrum utilization adjustment.

In an embodiment, in a case that the current available spectrum resource with respect to the other spectrum resource management device are more than the necessary spectrum resources for the target communication system, the adjustment object determining unit 1014 does not determine the other spectrum resource management device as the other spectrum resource management device involved in the spectrum utilization adjustment.

In an embodiment, in a case that multiple spectrum resource management devices operate in cooperation with each other, communication systems with lower authorities managed by all the spectrum resource management devices protect the target communication system. That is, available spectrum resources of the communication systems with lower authorities managed by all the spectrum resource management devices are reduced, so that when the communication systems with lower authorities operate in ranges of the reduced available spectrum resources, interference on the target communication system does not exceed the interference threshold of the target communication system. Further spectrum utilization adjustment is performed on only communication systems with lower authorities managed by the spectrum resource management devices involved in the spectrum utilization adjustment. That is, in a case that the available spectrum resources of the target communication system updated through the above protection are less than the necessary spectrum resources for the target communication system, the available spectrum resources of the communication systems with lower authorities managed by the spectrum resource management devices involved in the spectrum utilization adjustment are reduced again.

In an embodiment, in a case that the current available spectrum resources with respect to other spectrum resource management device are less than the necessary spectrum resources for the target communication system and the spectrum resources estimated to be available after adjusting are also less than the necessary spectrum resources for the target communication system, the adjustment object determining unit 1014 may determine that interference adjustment is needed to be performed on the communication system with the same authority as the target communication system.

Returning back to refer to FIG. 9, in an embodiment, the adjustment object determining unit 914 may compare the received information of corresponding available spectrum resources with the necessary spectrum resources for the target communication system, and determine a spectrum resource management device to be involved in the spectrum utilization adjustment according to a comparison result.

In an embodiment, the spectrum utilization adjustment request may include information instructing the other spectrum resource management device involved in the spectrum utilization adjustment to perform spectrum utilization adjustment on its managed communication systems with lower authorities.

In an embodiment, the interface unit 912 may receive information of updated available spectrum resources from the other spectrum resource management device involved in the spectrum utilization adjustment, and determine the available spectrum resources of the target communication system according to the information of the updated available spectrum resources.

Figure 11:
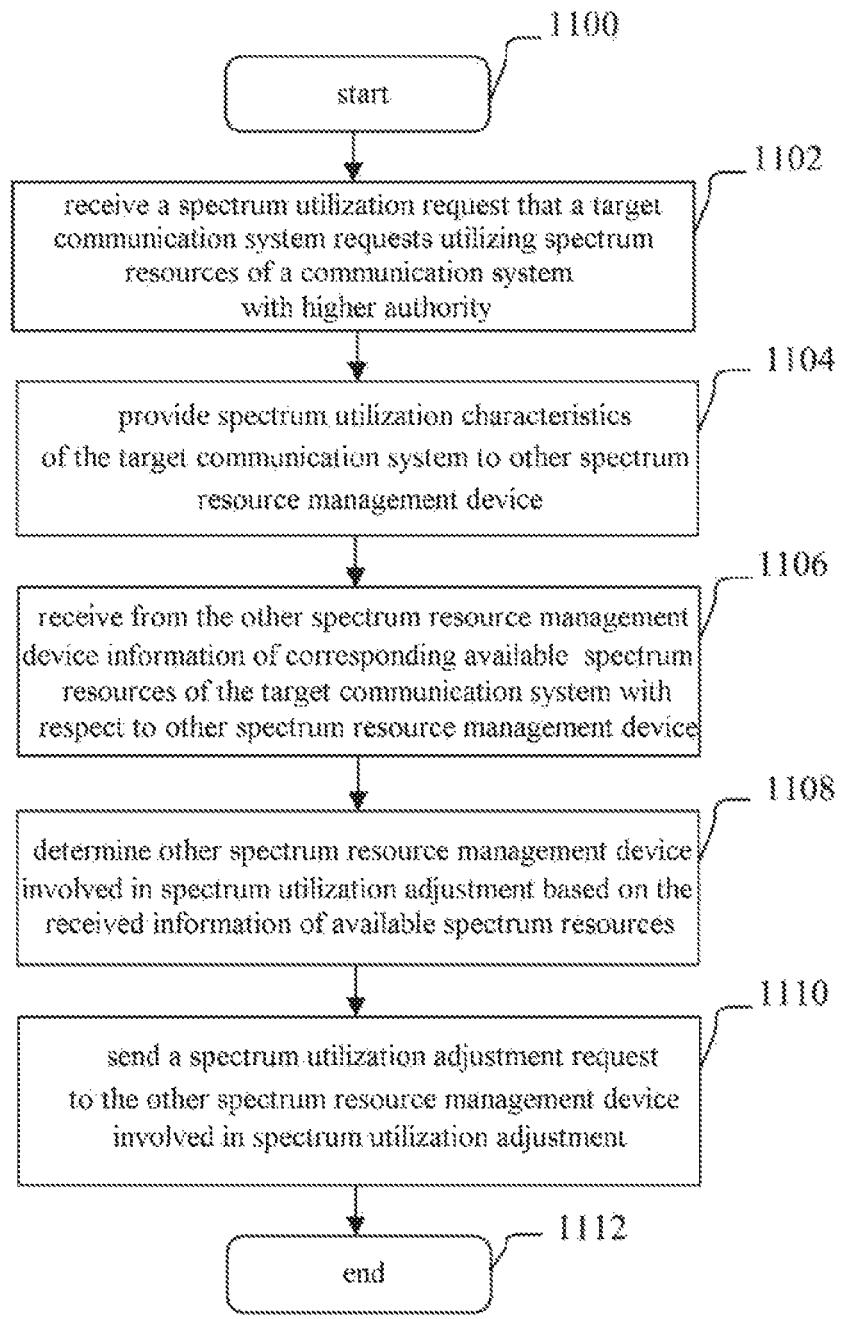
FIG. 11 is a schematic flowchart showing a spectrum resource management method according to another embodiment of the present disclosure.

Hereinafter a spectrum resource management method according to another embodiment of the present disclosure is described in conjunction with FIG. 11. FIG. 11 is a schematic flowchart showing a spectrum resource management method according to another embodiment of the present disclosure.

As shown in FIG. 11, the method starts from step 1100. After step 1100, the method proceeds to step 1102.

In step 1102, a spectrum utilization request that a target communication system requests utilizing spectrum resources of a communication system with higher authority may be received.

After step 1102, the method proceeds to step 1104.

In step 1104, spectrum utilization characteristics of the target communication system may be provided to other spectrum resource management device.

After step 1104, the method proceeds to step 1106.

In step 1106, information of corresponding available spectrum resources of the target communication system with respect to the other spectrum resource management device may be received from the other spectrum resource management device.

After step 1106, the method proceeds to step 1108.

In step 1108, other spectrum resource management device involved in spectrum utilization adjustment may be determined based on the received information of available spectrum resources.

In step 1108, the method proceeds to step 1110.

In step 1110, a spectrum utilization adjustment request may be sent to the other spectrum resource management device involved in the spectrum utilization adjustment.

Then, the method ends in step 1112.

The spectrum resource management method shown in FIG. 11 corresponds to the spectrum resource management device shown in FIG. 9, and hence the specific details thereof are not described here.

Figure 12:
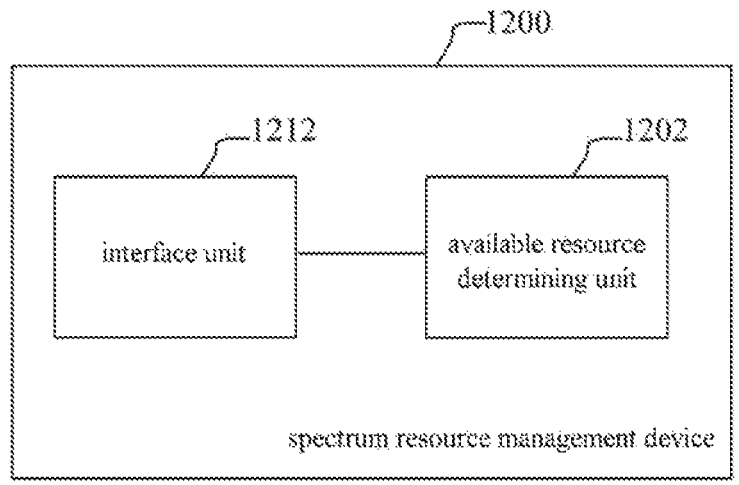
FIG. 12 is a block diagram showing a configuration example of a spectrum resource management device according to another embodiment of the present disclosure.

Hereinafter a spectrum resource management device according to another embodiment of the present disclosure is described in conjunction with FIG. 12. FIG. 12 shows a block diagram of a configuration example of a spectrum resource management device according to another embodiment of the present disclosure.

As shown in FIG. 12, a spectrum resource management device 1200 includes an interface unit 1212 and an available resource determining unit 1202.

The interface unit 1212 may receive spectrum utilization characteristics of a target communication system managed by other spectrum resource management device.

The available resource determining unit 1202 may determine, based on the spectrum utilization characteristics and a spectrum utilization condition of a communication system with lower authority managed by the spectrum resource management device 1200, current available spectrum resources and spectrum resources estimated to be available after adjusting of the target communication system. The available resource determining unit 1202 may estimate an increment with respect to the available spectrum resources of the target communication system obtained by reducing spectrum utilization of the communication system with lower authority so as to determine the spectrum resources estimated to be available after adjusting.

The interface unit 1212 may send the current available spectrum resources and the spectrum resources estimated to be available after adjusting to the other spectrum resource management device.

In another embodiment, the interface unit 1212 may also send the current available spectrum resources and the estimated increment with respect to the available spectrum resources of the target communication system obtained by reducing the spectrum utilization of the communication system with lower authority to the other spectrum resource management device. Accordingly, the spectrum resources estimated to be available after adjusting may be determined by the other spectrum resource management device according to the current available spectrum resources and the increment.

Figure 13:
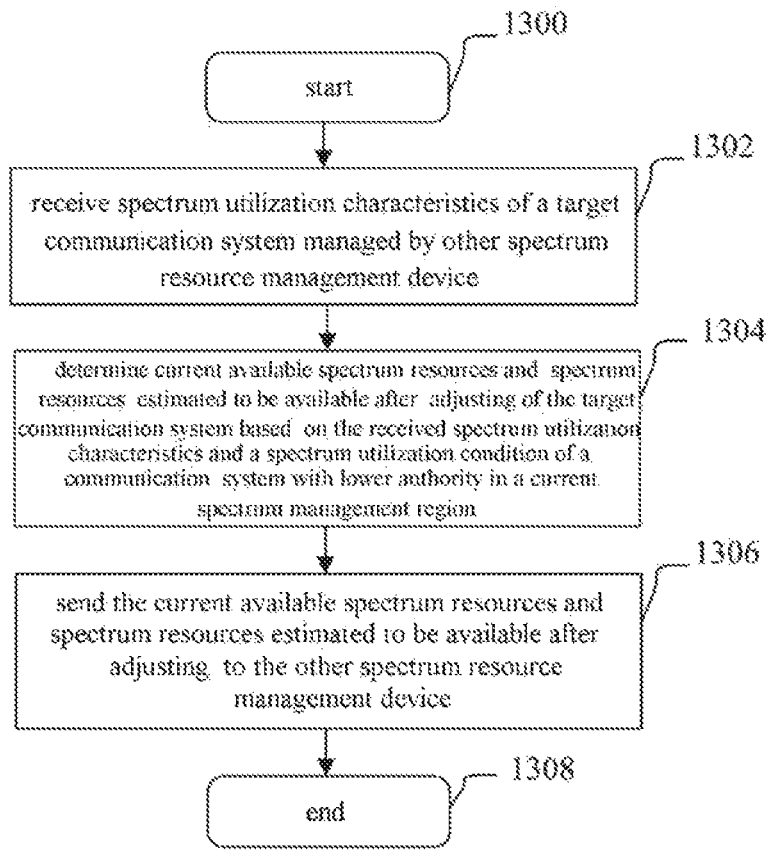
FIG. 13 is a schematic flowchart showing a spectrum resource management method according to another embodiment of the present disclosure.

Hereinafter a spectrum resource management method according to another embodiment of the present disclosure is described in conjunction with FIG. 13. FIG. 13 is a schematic flowchart showing a spectrum resource management method according to another embodiment of the present disclosure.

As shown in FIG. 13, the method starts from step 1300. After step 1300, the method proceeds to step 1302.

In step 1302, spectrum utilization characteristics of a target communication system managed by other spectrum resource management device may be received.

After step 1302, the method proceeds to step 1304.

In step 1304, current available spectrum resources and spectrum resources estimated to available after adjusting of the target communication system may be determined based on the received spectrum utilization characteristics and a spectrum utilization condition of a communication system with lower authority in a current spectrum management region.

The available spectrum resources estimated to be available after adjusting may be determined by estimating an increment with respect to the available spectrum resources of the target communication system obtained by reducing spectrum utilization of the communication system with lower authority.

The current spectrum management region is a region where the method is implemented. With this method, spectrum resource management is performed on communication systems with multiple levels of spectrum use authorities within the current spectrum management region.

After step 1304, the method proceeds to step 1306.

In step 1306, the current available spectrum resources and the spectrum resources estimated to be available after adjusting may be sent to the other spectrum resource management device.

Then, the method ends in step 1308.

The spectrum resource management method shown in FIG. 13 corresponds to the spectrum resource management device shown in FIG. 12, and hence the specific details thereof are not described here.

Figure 14:
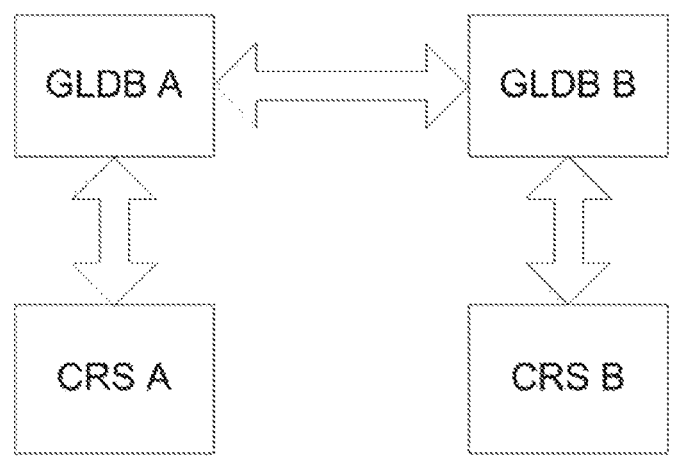
FIG. 14 is a schematic block diagram showing multiple spectrum resource management devices operating in cooperation with each other according to an embodiment of the present disclosure.

FIG. 14 is a schematic block diagram showing multiple spectrum resource management devices operating in cooperation with each other according to an embodiment of the present disclosure. In FIG. 14, GLDB A and GLDB B are examples of the spectrum resource management device according to the embodiment of the present disclosure, and CRS (Cognitive Radio System) A and CRS B are examples of the secondary system according to the embodiment of the present disclosure. As shown in FIG. 14, the secondary system (for example CRS A or CRS B) provides corresponding information to the GLDB (for example GLDB A or GLDB B) and obtains available spectrum resource information from the GLDB. The GLDB (for example GLDB A or GLDB B) interacts with other GLDB (for example GLDB B or GLDB A) and determines available spectrum resources of the secondary system.

Figure 15:
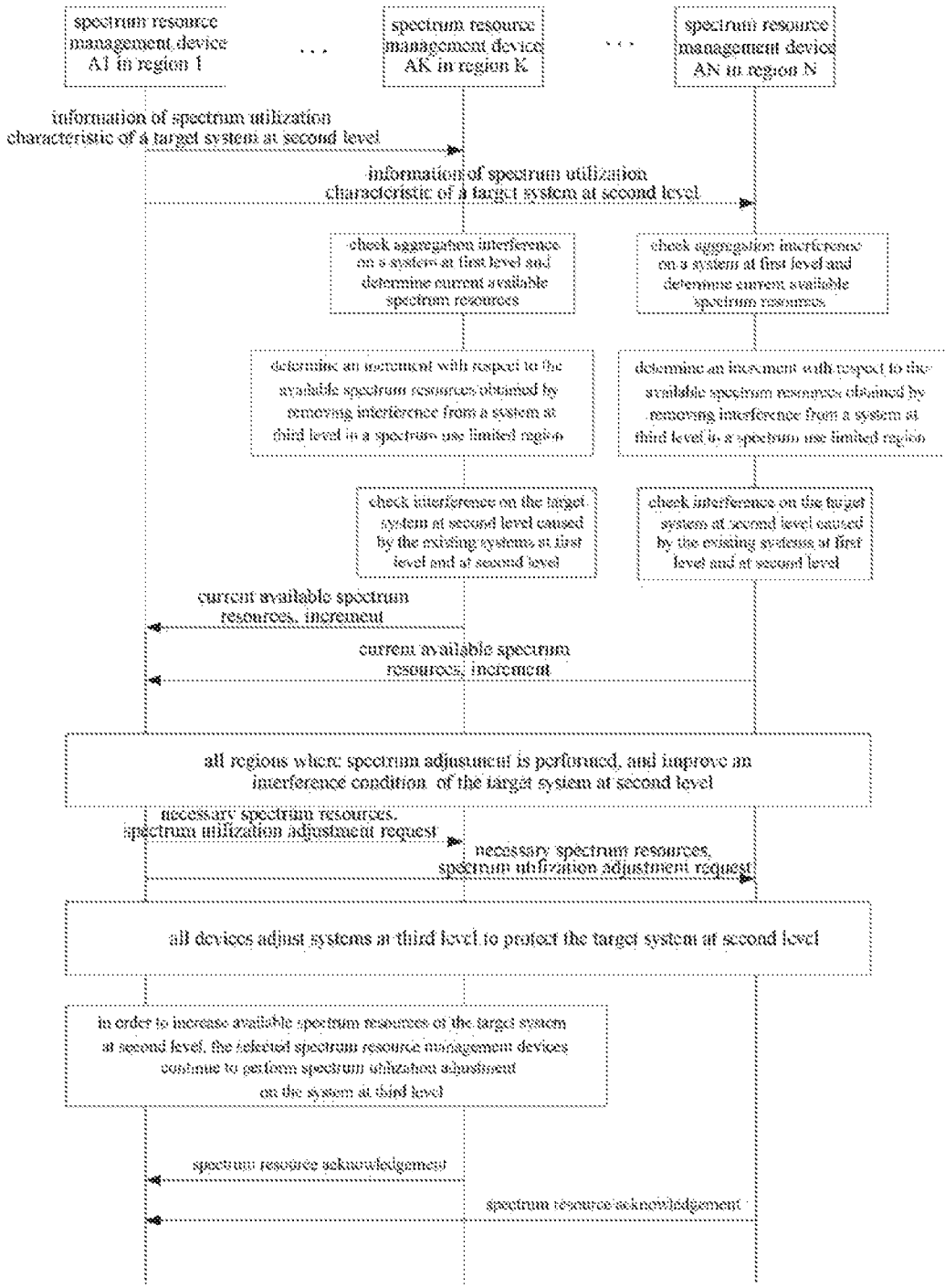
FIG. 15 is a schematic sequence diagram showing an application example of a spectrum resource management method according to an embodiment of the present disclosure.

FIG. 15 is a schematic sequence diagram showing an application example of a spectrum resource management method according to an embodiment of the present disclosure. In the example shown in FIG. 15, N spectrum resource management devices A1 to AN in N regions operate in cooperation with each other, where N is a positive integer greater than 2. Each of the N spectrum resource management devices is the spectrum resource management device according to the embodiment of the present disclosure. For conciseness, only a spectrum resource management device A1 in region 1, a spectrum resource management device AK in region K and a spectrum resource management device AN in region N are shown in FIG. 15, where K is a positive integer greater than 1 and less than N.

As shown in FIG. 15, after receiving a spectrum utilization request from a target system at second level (a target communication system), the spectrum resource management device A1 communicates with other spectrum resource management devices AK and AN, and sends to the other spectrum resource management devices AK and AN information of spectrum utilization characteristics of the target system at second level, for example an interference threshold, necessary spectrum resources and/or position information and so on of the target system at second level. After receiving the information of the spectrum utilization characteristics of the target system at second level, each of the other spectrum resource management devices AK and AN detects aggregation interference on a system at first level (a communication system with higher authority) within a management region of the other spectrum resource management device caused by a system at third level (a communication system with lower authority) within the management region of the other spectrum resource management device and the target system at second level (preferably, determining the aggregation interference on the system at first level caused by a system at second level (a communication system with same authority) and the system at third level within the management region as well as the target system at second level), and determines current available spectrum resources of the target communication system; determines an increment with respect to the available spectrum resources obtained by removing interference from the system at third level in a spectrum use limited region; and checks interference on the target system at second level caused by the existing systems at first level and at second level within the management region of the other spectrum resource management device. Then, each of the other spectrum resource management devices AK and AN sends the determined current available spectrum resources and increment of the target system at second level to the spectrum resource management device A1. In a preferred embodiment, each of the other spectrum resource management devices AK and AN may further send the determined interference on the target system at second level to the spectrum resource management device A1. The spectrum resource management device A1 determines spectrum resource management devices which are needed to be involved in spectrum utilization adjustment according the available spectrum resources and the increment of the target system at second level determined by the spectrum resource management device A1 itself and the current available spectrum resources and the increment received from each of the other spectrum resource management devices (for example, determining that the spectrum resource management devices A1 and AK are needed to be involved in the spectrum utilization adjustment), and coordinates, in a case that the necessary spectrum resources for the target system at second level cannot be met through only spectrum utilization adjustment, respective spectrum resource management devices to perform interference adjustment so as to improve an interference condition of the target system at second level. Then, the spectrum resource management device A1 may send the recalculated necessary spectrum resources for the target system at second level and a spectrum utilization adjustment request (both of which may be separate messages, or the necessary spectrum resources may be included in the spectrum resource adjustment request) to all the other spectrum resource management devices AK and AN. All the other spectrum resource management devices AK and AN adjust spectrum resources of respectively managed systems at third level to protect the target system at second level. The spectrum resource management device A1 itself also adjusts spectrum resources of its managed system at third level to protect the target system at second level. Then, in order to increase the available spectrum resources of the target system at second level, the spectrum resource management devices A1 and AK selected to be involved in the spectrum utilization adjustment continue to perform spectrum utilization adjustment on respectively managed systems at third level, until the necessary spectrum resources for the target system at second level are met. Then, each of the other spectrum resource management devices AK and AN sends a spectrum resource acknowledgement message to the spectrum resource management device A1, so as to inform the spectrum resource management device A1 of the available spectrum resources finally determined to be provided to the target system at second level. In this way, spectrum resource management performed by the multiple spectrum resource management devices A1, AK and AN in cooperation with each other is completed. For specific implementation details of each of the steps in FIG. 15, reference may be made to the above descriptions of the devices and methods according to the embodiments of the present disclosure, which are not repeated here.

Figure 16:
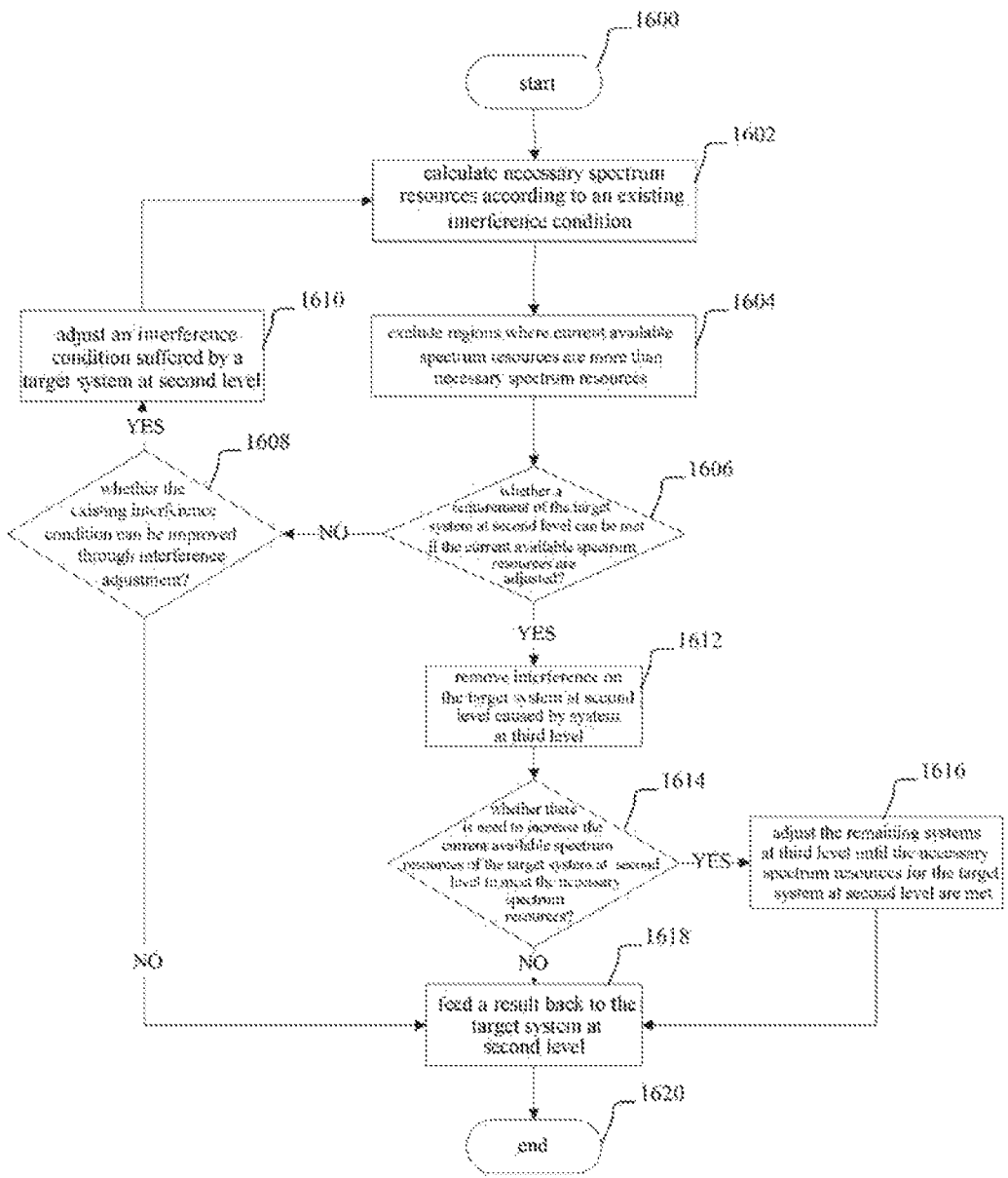
FIG. 16 is a schematic flowchart showing an application example of a spectrum resource management method according to an embodiment of the present disclosure.

FIG. 16 is a schematic flowchart showing an application example of a spectrum resource management method according to an embodiment of the present disclosure. In an example of FIG. 16, a system at second level is taken as an example of the target communication system. As shown in FIG. 16, the method starts from step 1600. Then, in step 1602, necessary spectrum resources for the target system at second level are calculated according to an existing interference condition. In a case that only one management region is considered, the existing interference condition may refer to a condition of interference on the target system at second level caused by a communication system with higher authority (for example a system at first level) and a communication system with same authority (for example a system at second level) within the management region. In a case that multiple management regions are considered, the existing interference condition may refer to a condition of interference on the target system at second level caused by the communication systems with higher authorities and the communication systems with same authorities within respective management regions. Then, in step 1604, management regions which can provide the target system at second level with higher current available spectrum resources than the necessary spectrum resources for the target system at second level are excluded, and there is no need to perform spectrum utilization adjustment in these regions. For the remaining management regions, it is determined in step 1606 whether a requirement of the target system at second level (the necessary spectrum resources) can be met if the current available spectrum resources are adjusted. As described above, for a management region in which a sum of the current available spectrum resources of the target system at second level and a maximum increment with respect to the current available spectrum resources of the target system at second level obtained by reducing available spectrum resources of the communication system with lower authority is less than the necessary spectrum resources for the target system at second level, the spectrum resource requirement of the target system at second level cannot be met through only spectrum utilization adjustment. If a determination result in step 1606 is NO, it is determined in step 1608 whether the existing interference condition can be improved through adjustment. If YES, in step 1610, the interference condition suffered by the target system at second level is adjusted. For example, interference on the target system at second level caused by systems at second level within all the spectrum resource management regions may be adjusted. Then, the method proceeds to step 1602 again, to calculate the necessary spectrum resources for the target system at second level according to the adjusted existing interference condition, and then continues to perform step 1604 and subsequent operations. If it is determined in step 1608 that the existing interference condition cannot be improved through adjustment, it is indicated that the necessary spectrum resources cannot be provided for the target system at second level, and the method proceeds to step 1618 to feed back to the target system at second level a result that the necessary spectrum resources cannot be provided for the target system at second level.

Continuing to refer to FIG. 16, if it is determined in step 1606 that the requirement of the target system at second level can be met by adjusting the current available spectrum resources, the method proceeds to step 1612. In step 1612, interference on the target system at second level caused by systems at third level within all management regions is removed so as to protect the target system at second level. Then, in step 1614, it is determined whether there is need to increase the current available spectrum resources of the target system at second level so as to meet the necessary spectrum resources for the target system at second level. If a determination result in step 1614 is NO, it is indicated that the current available spectrum resources provided for the target system at second level by each of the management regions meet the necessary spectrum resources for the target system at second level, and hence the method proceeds to step 1618 to feed the determination result back to the target system at second level. On the other hand, if the determination result in step 1614 is YES, it is indicated that there is a management region in which the provided current available spectrum resources cannot meet the necessary spectrum resources, then in step 1616, available spectrum resources of the remaining systems at third level are adjusted continuously, until the necessary spectrum resources for the target system at second level are met, that is, until the current available spectrum resources of the target system at second level are more than or equal to the necessary spectrum resources. Then, in step 1618, the result is fed back to the target system at second level.

After step 1618 the method ends in step 1620.

For specific implementation details of each of the steps in FIG. 16, reference may be made to the above descriptions of the methods according to the embodiments of the present disclosure, which are not repeated here.

The spectrum resource management device and method according to each of the embodiments of the present disclosure are described in conjunction with the drawings above. In each of the above embodiments, the target communication system is a secondary system in cognitive radio technology. In addition, the spectrum resource management device according to each of the embodiments may include a database for managing spectrum resource utilization of the secondary system.

In addition, an embodiment of the present disclosure further provides a program product carrying machine executable instructions which, when executed on an information processing apparatus, cause the information processing apparatus to perform the spectrum resource management method according to the embodiments of the present disclosure.

In addition, an embodiment of the present disclosure further provides a storage medium containing machine readable program codes which, when executed on an information processing apparatus, cause the information processing apparatus to perform the spectrum resource management method according to the embodiments of the present disclosure.

Accordingly, a storage medium on which the above program product storing machine readable instructions is carried is also included in the present disclosure. The storage medium includes but not limited to a floppy disk, an optical disk, a magneto-optical disk, a storage card, a memory rod and the like.

The spectrum resource management device and constituent components thereof according to the embodiments of the present disclosure can be configured in software, firmware, hardware or combinations thereof. Specific means or manners available for configuration are well known to those skilled in the art, and no detailed description will be made herein. In the case of being embodied in software and/or firmware, a program constituting the software is installed from a storage medium or a network to an information processing apparatus with a dedicated hardware structure, e.g., an information processing apparatus 1700 illustrated in FIG. 17, which computer can perform various functions when various programs are installed thereon.

Figure 17:
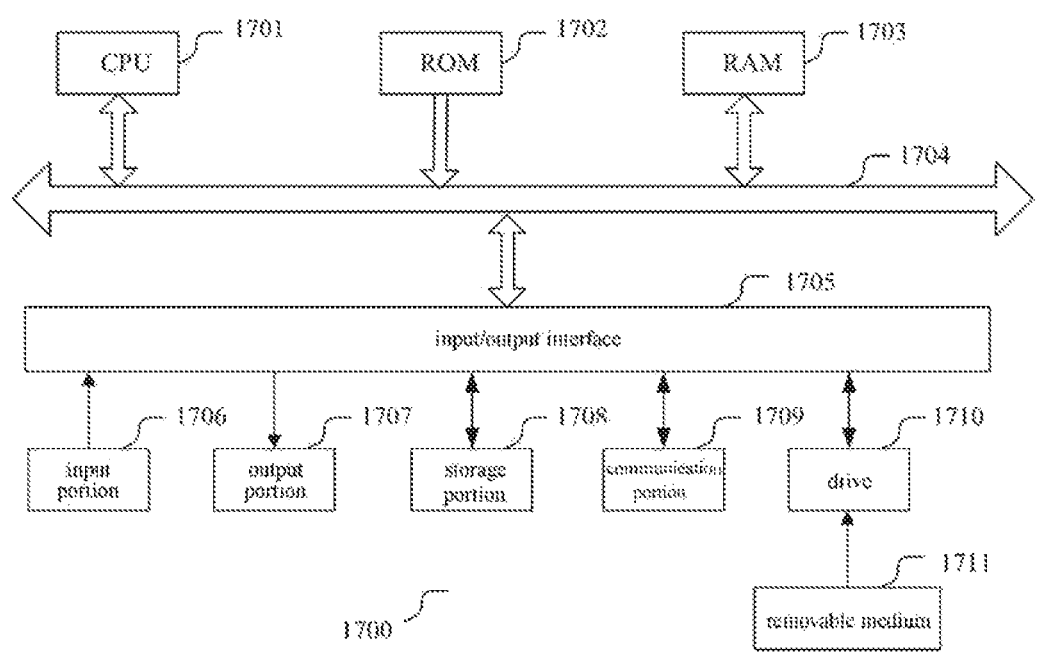
FIG. 17 shows a schematic block diagram of an information processing apparatus that may be used for implementing an embodiment of the present disclosure.

FIG. 17 shows a schematic block diagram of an information processing apparatus that may be used for implementing an embodiment of the present disclosure.

In FIG. 17, a Central Processing Unit (CPU) 1701 performs various processes according to a program stored in a Read Only Memory (ROM) 1702 or loaded from a storage portion 1708 into a Random Access Memory (RAM) 1703 in which data required when the CPU 1701 performs the various processes is also stored as needed. The CPU 1701, the ROM 1702 and the RAM 1703 are connected to each other via a bus 1704 to which an input/output interface 1705 is also connected.

The following components are connected to the input/output interface 1705: an input portion 1706 including a keyboard, a mouse, etc.; an output portion 1707 including a display, e.g., a Cathode Ray Tube (CRT), a Liquid Crystal Display (LCD), etc., a speaker, etc.; a storage portion 1708 including a hard disk, etc.; and a communication portion 1709 including a network interface card, e.g., an LAN card, a modem, etc. The communication portion 1709 performs a communication process over a network, e.g., the Internet. A drive 1710 may be also connected to the input/output interface 1705 as needed. A removable medium 1711, e.g., a magnetic disk, an optical disk, an magneto optical disk, a semiconductor memory, etc., can be installed on the drive 1710 as needed so that a computer program read therefrom can be installed into the storage portion 1708 as needed.

In the case that the foregoing series of processes are embodied in software, a program constituting the software is installed from a network, e.g., the Internet, etc., or a storage medium, e.g., the removable medium 1711, etc.

Those skilled in the art shall appreciate that such a storage medium will not be limited to the removable medium 1711 illustrated in FIG. 17 in which the program is stored and which is distributed separately from the apparatus to provide a user with the program. Examples of the removable medium 1711 include a magnetic disk (including a Floppy Disk (a registered trademark)), an optical disk (including Compact Disk-Read Only Memory (CD-ROM) and a Digital Versatile Disk (DVD)), a magneto optical disk (including a Mini Disk (MD) (a registered trademark)) and a semiconductor memory. Alternatively the storage medium can be the ROM 1702, a hard disk included in the storage portion 1708, etc., in which the program is stored and which is distributed together with the apparatus including the same to the user.

The instruction codes, when read and executed by a machine, may execute the spectrum resource management method according to the embodiments of the present disclosure.

For those skilled in the art, it is obvious that many modifications and variations may be made without deviating from the scope and spirit of the present disclosure. The selections and illustrations of the embodiments are intended to better explain the principles and actual applications of the present disclosure, so that those skilled in the art understand that the present disclosure may include various implementations having various variations adapted to required specific uses.

The invention claimed is:

1. A spectrum resource management device, applied to a management region comprising a target communication system, a communication system with higher authority and a communication system with lower authority, wherein the communication system with higher authority has a higher spectrum use authority than the target communication system and the communication system with lower authority has a lower spectrum use authority than the target communication system, and the spectrum resource management device comprises:
   circuitry configured to
   determine available spectrum resources of the target communication system, so that when the target communication system operates in a range of the available spectrum resources and the communication system with lower authority operates in a range of available spectrum resources of the communication system with lower authority, aggregation interference on the communication system with higher authority caused by the target communication system and the communication system with lower authority is lower than an interference threshold of the communication system with higher authority,
   reduce the available spectrum resources of the communication system with lower authority, so that when the communication system with lower authority operates in a range of the reduced available spectrum resources, interference on the target communication system caused by the communication system with lower authority is lower than an interference threshold of the target communication system, and
   update the available spectrum resources of the target communication system according to the reduced available spectrum resources of the communication system with lower authority, so that when the target communication system operates in a range of the updated available spectrum resources and the communication system with lower authority operates in the range of the reduced available spectrum resources, the aggregation interference is lower than the interference threshold of the communication system with higher authority.

2. The device according to claim 1, wherein
   circuitry is further configured to
   reduce the available spectrum resources of the communication system with lower authority in a case that the updated available spectrum resources of the target communication system are less than necessary spectrum resources for the target communication system, and
   update, in a case that the updated available spectrum resources of the target communication system are less than the necessary spectrum resources for the target communication system, the available spectrum resources of the target communication system according to the currently reduced available spectrum resources of the communication system with lower authority, so that when the target communication system operates in a range of the currently updated available spectrum resources and the communication system with lower authority operates in a range of the currently reduced available spectrum resources, the aggregation interference does not exceed the interference threshold of the communication system with higher authority, until the currently updated available spectrum resources of the target communication system are equal to or more than the necessary spectrum resources for the target communication system.

3. The device according to claim 2, wherein the circuitry is further configured to reduce, in a case that the currently updated available spectrum resources are still less than the necessary spectrum resources for the target communication system, interference on the target communication system caused by other communication system with same authority within the management region, wherein the communication system with same authority has the same spectrum use authority as the target communication system, and recalculate the necessary spectrum resources for the target communication system according to interference on the target communication system caused by the communication system with higher authority and the communication system with same authority and Quality of Service requirements of the target communication system.

4. The device according to claim 3, wherein circuitry is further configured to calculate the necessary spectrum resources for the target communication system according to interference on the target communication system caused by all communication systems with higher authority and communication systems with same authority within the management region and a management region of other spectrum resource management device in communication with the spectrum resource management device and the Quality of Service requirements of the target communication system.

5. The device according to claim 1, wherein the circuitry is further configured to determine, before the available spectrum resources of the communication system with lower authority are reduced, maximum available spectrum resources of the target communication system in a case that the communication system with lower authority does not interfere with the communication system with higher authority, reduce, in a case that the maximum available spectrum resources of the target communication system are less than necessary spectrum resources for the target communication system, interference on the target communication system caused by a communication system with same authority within the management region, wherein the communication system with same authority has the same spectrum use authority as the target communication system, and recalculate the necessary spectrum resources for the target communication system according to interference on the target communication system caused by the communication system with higher authority and the communication system with same authority and Quality of Service requirements of the target communication system.

6. The device according to claim 1, wherein circuitry is further configured to stop a communication system with lower authority within the management region, which operates in an exclusive service region of the target communication system.

7. The device according to claim 1, wherein the circuitry is further configured to perform at least one of:

receiving a spectrum utilization request of the target communication system, wherein the spectrum utilization request comprises the interference threshold, necessary spectrum resources and/or position information of the target communication system;

sending the interference threshold, the necessary spectrum resources and/or the position information of the target communication system to other spectrum resource management device;

receiving, from the other spectrum resource management device, current available spectrum resources of the target communication system with respect to the other spectrum resource management device and a maximum increment with respect to the current available spectrum resources of the target communication system obtained by reducing available spectrum resources of a communication system with lower authority managed by the other spectrum resource management device;

receiving, from the other spectrum resource management device, information of corresponding interference on the target communication system caused by a communication system with higher authority and a communication system with same authority managed by the other resource management device;

sending a spectrum utilization adjustment request to the other spectrum resource management device involved in spectrum utilization adjustment;

receiving, from the other spectrum resource management device involved in the spectrum utilization adjustment, updated current available spectrum resources of the target communication system;

sending an interference adjustment request to the other spectrum resource management device involved in interference adjustment; and receiving, from the other spectrum resource management device involved in the interference adjustment, information of adjusted interference on the target communication system caused by a communication system with same authority managed by the other spectrum resource management device.

8. The device according to claim 7, wherein the circuitry is further configured to determine the other spectrum resource management device, for which the current available spectrum resources received therefrom are less than the necessary spectrum resources for the target communication system and a sum of the current available spectrum resources and the maximum increment received therefrom is equal to or more than the necessary spectrum resources for the target communication system, as a spectrum resource management device involved in the spectrum utilization adjustment, and determine the other spectrum resource management device, for which a sum of the current available spectrum resources and the maximum increment received therefrom is less than the necessary spectrum resources for the target communication system, as a spectrum resource management device involved in the interference adjustment.

9. The device according to claim 1, wherein the circuitry is further configured to perform at least one of:
receiving the interference threshold, necessary spectrum resources and/or position information of the target communication system managed by other spectrum resource management device;
sending current available spectrum resources of the target communication system and a maximum increment with respect to the current available spectrum resources of the target communication system obtained by reducing the available spectrum resources of the communication system with lower authority within the management region to the other spectrum resource management device;
sending information of corresponding interference on the target communication system caused by the communication system with higher authority and a communication system with same authority within the management region to the other spectrum resource management device;
receiving a spectrum utilization adjustment request from the other spectrum resource management device;
sending updated current available spectrum resources of the target communication system to the other spectrum resource management device;
receiving an interference adjustment request from the other spectrum resource management device; and
sending information of adjusted interference on the target communication system caused by the communication system with same authority within the management region to the other spectrum resource management device.

10. A spectrum resource management method, applied to a management region comprising a target communication system, a communication system with higher authority and a communication system with lower authority, wherein the communication system with higher authority has a higher spectrum use authority than the target communication system and the communication system with lower authority has a lower spectrum use authority than the target communication system, and the spectrum resource management method comprises:
determining available spectrum resources of the target communication system, so that when the target communication system operates in a range of the available spectrum resources and the communication system with lower authority operates in a range of available spectrum resources of the communication system with lower authority, aggregation interference on the communication system with higher authority caused by the target communication system and the communication system with lower authority is lower than an interference threshold of the communication system with higher authority;
reducing the available spectrum resources of the communication system with lower authority, so that when the communication system with lower authority operates in a range of the reduced available spectrum resources, interference on the target communication system caused by the communication system with lower authority is lower than an interference threshold of the target communication system; and
updating the available spectrum resources of the target communication system according to the reduced available spectrum resources of the communication system with lower authority, so that when the target communication system operates in a range of the updated available spectrum resources and the communication system with lower authority operates in a range of the reduced available spectrum resources, the aggregation interference is lower than the interference threshold of the communication system with higher authority.

11. A spectrum resource management device, comprising: circuitry configured to:
receive a spectrum utilization request that a target communication system requests utilizing spectrum resources of a communication system with higher authority,
provide spectrum utilization characteristics of the target communication system to other spectrum resource management device,
receive, from the other spectrum resource management device, information of corresponding available spectrum resources of the target communication system with respect to the other spectrum resource management device, and
determine other spectrum resource management device involved in spectrum utilization adjustment based on the information of the available spectrum resources received by the interface unit,
wherein the circuitry is further configured to send a spectrum utilization adjustment request to the other spectrum resource management device involved in the spectrum utilization adjustment, and
wherein the circuitry is further configured to receive, from the other spectrum resource management device, information of interference on the target communication system caused by a communication system with higher authority and a communication system with same authority managed by the other spectrum resource management device.

12. The device according to claim 11, wherein the spectrum utilization adjustment request comprises information of necessary spectrum resources for the target communication system.

13. The device according to claim 11, wherein the spectrum utilization request comprises Quality of Service information, and
wherein the circuitry is further configured to determine information of necessary spectrum resources for the target communication system based on the Quality of Service information and the received information of interference.

14. The device according to claim 11, wherein the received information of corresponding available spectrum resources comprises information about current available spectrum resources and spectrum resources estimated to be available after adjusting.

15. The device according to claim 14, wherein when the current available spectrum resources of the other spectrum resource management device are less than necessary spectrum resources for the target communication system while the spectrum resources estimated to be available after adjusting are equivalent to or more than the necessary spectrum resources for the target communication system, the circuitry is further configured to determine the other spectrum resource management device as the other spectrum resource management device involved in the spectrum utilization adjustment.

16. The device according to claim 14, wherein when the current available spectrum resources of the other spectrum resource management device are more than necessary spectrum resources for the target communication system, the circuitry is further configured to not determine the other spectrum resource management device as the other spectrum resource management device involved in the spectrum utilization adjustment.

17. The device according to claim 14, wherein when the current available spectrum resources of the other spectrum resource management device are less than necessary spectrum resources for the target communication system while the spectrum resources estimated to be available after adjusting are also less than the necessary spectrum resources for the target communication system, the circuitry is further configured to determine that interference adjustment is required to be performed for a communication system with the same authority as the target communication system.

18. The device according to claim 11, wherein the circuitry is further configured to compare the received information of corresponding available spectrum resources with necessary spectrum resources for the target communication system and determine the spectrum resource management device involved in the spectrum utilization adjustment according to a comparison result.

19. The device according to claim 11, wherein the spectrum utilization adjustment request comprises information instructing the other spectrum resource management device involved in the spectrum utilization adjustment to perform spectrum utilization adjustment for a communication system with lower authority managed by the other spectrum resource management device involved in the spectrum utilization adjustment.

\* \* \* \* \*